US007015444B2

(12) United States Patent
Kawano et al.

(10) Patent No.: US 7,015,444 B2
(45) Date of Patent: Mar. 21, 2006

(54) OPTICAL-SCANNING EXAMINATION APPARATUS

(75) Inventors: Yoshihiro Kawano, Hachioji (JP); Tadashi Hirata, Hachioji (JP); Tatsuo Nakata, Hino (JP); Yoshihisa Tanikawa, Chuo-ku (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/085,047

(22) Filed: Mar. 22, 2005

(65) Prior Publication Data

US 2005/0211872 A1   Sep. 29, 2005

(30) Foreign Application Priority Data

| Mar. 25, 2004 | (JP) | ............................. 2004-090002 |
| Mar. 26, 2004 | (JP) | ............................. 2004-091050 |
| Apr. 14, 2004 | (JP) | ............................. 2004-119328 |

(51) Int. Cl.
*G02B 27/40* (2006.01)
*G02B 27/64* (2006.01)
*G02B 7/04* (2006.01)

(52) U.S. Cl. ............................... 250/201.3; 250/458.1; 385/119; 359/368

(58) Field of Classification Search ............. 250/201.3, 250/227.26, 458.1; 385/119; 359/368
See application file for complete search history.

(56) References Cited

U.S. PATENT DOCUMENTS

| 5,587,832 | A | * | 12/1996 | Krause ......................... 359/385 |
| 5,822,486 | A | * | 10/1998 | Svetkoff et al. ............. 385/116 |
| 6,663,560 | B1 | * | 12/2003 | MacAulay et al. ......... 359/298 |
| 6,747,795 | B1 | * | 6/2004 | Lin et al. ..................... 359/385 |
| 2005/0174425 | A1 | * | 8/2005 | Harris ......................... 359/372 |

FOREIGN PATENT DOCUMENTS

| EP | 2002090628 | 3/2002 |
| JP | 2002-90628 | 3/2002 |
| JP | 2003-344777 | 12/2003 |
| WO | WO 99/22262 | 5/1999 |
| WO | WO 01/44854 A2 | 6/2001 |

OTHER PUBLICATIONS

Letter to Olive International Patent Office addressed to Mr. Masayuki Koizumi enclosing European Patent Office Search Report dated Aug. 25, 2005 from Philip Gehrig of Wuesthoff & Wuesthoff.
Communication dated Aug. 1, 2005 received from the European Patent Office attaching European search report.

(Continued)

*Primary Examiner*—David Porta
*Assistant Examiner*—Seung C. Sohn
(74) *Attorney, Agent, or Firm*—Kenyon & Kenyon

(57) ABSTRACT

The invention provides an optical-scanning examination apparatus with a simple configuration, in which the resolution of acquired images can be freely changed and in which the fluorescence image intensity and examination depth can be adjusted to suit the purpose of examination. The optical-scanning examination apparatus includes a light source unit; a focusing lens for forming a first intermediate image of excitation light; an imaging lens; a first objective lens; an optical fiber bundle; a second objective lens; and an imaging unit for imaging return light that returns via the second objective lens, the optical fiber bundle, the first objective lens, and the imaging lens. In addition, a scanning mirror device, which is disposed at the first intermediate image position, is formed of a plurality of mirrors that simultaneously receive the first intermediate image and that can be selectively turned on and off.

5 Claims, 14 Drawing Sheets

OTHER PUBLICATIONS

IE 000001 "Optical Imaging Systems" cover page and 11 page specification and 7 drawing pages.
2412 Optics Letters, 18 (1993) Apr. 15, No. 8, New York, US Letters pp. 565-567, entitled Confocal microscopy through a fiber-optic imaging bundle, Arthur F. Gmitro and David Aziz, Dept. of Radiology and the Optical Sciences Center, University of Arizona, Tucson, Arizona 85724, © 1993 Optical Society of America.
XP-002336379, Confocal Microendoscopy with Chromatic Sectioning, Pierre M. Lane, Robert P. Elliott and Calum E. MacAulay, Cancer Imaging Dept., BC Cancer Research Center, Vancouver BC, Canada, Digital Optical Imaging Corp., Bellingham WA, USA, pp. 23-26.

* cited by examiner

OPTICAL-SCANNING EXAMINATION APPARATUS

BACKGROUND OF THE INVENTION

1. Field of the Invention

The present invention relates to an optical-scanning examination apparatus.

2. Description of Related Art

In the related art, the apparatus disclosed in Japanese Unexamined Patent Application Publication No. 2003-344777 (FIG. 1, etc.) is a known example of this type of optical-scanning examination apparatus.

This optical-scanning examination apparatus includes a scanning laser microscope formed of a fluorescence microscope, an optical fiber bundle one end of which is disposed at the focal plane of a first objective lens in this scanning laser microscope, and a second objective lens disposed so that the other end of this optical fiber bundle serves as a light source therefor.

With this optical-scanning examination apparatus, the end of the optical fiber functions as a confocal pinhole, and fluorescence is produced at the focal position of the second objective lens by the laser light focused thereat. This allows the internal structure of a living organism to be determined.

Japanese Unexamined Patent Application Publication No. 2003-344777 also discloses a confocal scanner in which a focusing disk and a pinhole disk are connected and rotationally driven with a motor. By using this confocal scanner, a plurality of spots are scanned on the specimen simultaneously, which enables confocal images to be acquired at high speed.

However, the optical-scanning examination apparatus disclosed in Japanese Unexamined Patent Application Publication No. 2003-344777 uses a single pinhole disk including a fixed-type confocal pinhole or a predetermined pinhole pattern. Therefore, the region that can be examined is restricted to an extremely thin region in the depth direction below the surface of the living organism. As a result, this apparatus suffers from the drawback that it is difficult to detect or focus on the examination site. To overcome this drawback, a plurality of confocal pinholes or pinhole disks are prepared, and they can be replaced. However, this results in the drawback that the ease-of-use is reduced and the operation becomes cumbersome. Also, in some cases it may be preferable to obtain bright fluorescence images from deep within the object under examination, even though the resolution is low.

BRIEF SUMMARY OF THE INVENTION

The present invention has been conceived in light of the circumstances described above. An object of the present invention is to provide an optical-scanning confocal microscope apparatus having a simple configuration, in which the resolution of acquired images can be freely adjusted and in which the brightness and examination depth of fluorescence images can be adjusted according to the type of examination to be performed.

To achieve the object described above, the present invention provides the following features.

According to one aspect, the present invention provides an optical-scanning examination apparatus including a light source unit; a focusing lens for forming a first intermediate image of excitation light emitted from the light source unit; an imaging lens for focusing the first intermediate image; a first objective lens for forming a second intermediate image of the excitation light focused by the imaging lens; an optical fiber bundle one end face of which is disposed near the second intermediate image position; a second objective lens, disposed at the other end face of the optical fiber bundle, for imaging light emitted from the other end face of the optical fiber bundle onto a specimen; an imaging unit for imaging return light that returns via the second objective lens, the optical fiber bundle, the first objective lens, and the imaging lens; and a scanning mirror device, disposed at the first intermediate image position, the scanning mirror device being formed of a plurality of mirrors that simultaneously receive the first intermediate image and that can be selectively turned on and off.

According to the invention, the excitation light emitted from the light source unit is focused with the focusing lens to form a first intermediate image. Since the scanning mirror device is disposed at the position of the first intermediate image, by selectively turning on and off the plurality of mirrors constituting the scanning mirror device, the excitation light forming the first intermediate image can be partially reflected, and can be irradiated onto the specimen via the imaging lens, the first objective lens, the optical fiber bundle, and the second objective lens. Returning light, such as fluorescence generated at the specimen, returns via the second objective lens, the optical fiber bundle, the first objective lens, and the imaging lens, and only the light reflected at the turned-on mirrors in the scanning mirror device is imaged in the imaging unit.

By sequentially switching the turned-on mirror in the mirrors constituting the scanning mirror device, the irradiation position of the excitation light on the specimen can be changed, which enables examination of wide area. By making each mirror constituting the scanning mirror device sufficiently small, each mirror can be made to function as a confocal pinhole, which allows confocal fluorescence images of a wide examination site at a predetermined depth below the surface of the specimen to be acquired.

In this case, since the on/off state of the mirrors in the scanning mirror device can be arbitrarily changed, it is possible to achieve an effect similar to switching between a plurality of confocal pinholes by changing the on/off state of the mirrors. In other words, when it is desired to obtain high-resolution confocal images, this can be achieved by reducing the number of turned-on mirrors, and when it is desired to obtain a bright image at a certain depth, this can be achieved by turning on a plurality of adjacent mirrors.

The optical-scanning examination apparatus according to the above-described aspect may also include a control apparatus for controlling the driving pattern of each mirror constituting the scanning mirror device.

By operating the control apparatus to control each mirror with a predetermined driving pattern, it is possible to select a desired examination format, which allows examination that best suits the type of examination object. Also, the driving pattern can be changed easily and quickly with the control apparatus.

Preferably, in the optical-scanning examination apparatus according to the above-described aspect, the optical fiber bundle includes a plurality of fiber cores, and each mirror constituting the scanning mirror device and each fiber core constituting the optical fiber bundle are disposed in one-to-one correspondence. With this configuration, the light can propagate efficiently in both the scanning mirror device and the optical fiber bundle without restricting the resolution.

Preferably, in the optical-scanning examination apparatus according to the above-described aspect, the optical fiber bundle includes a plurality of fiber cores, and each mirror constituting the scanning mirror device and each fiber core constituting the optical fiber bundle are disposed in one-to-many or many-to-one correspondence.

With this configuration, the resolution is limited by either the scanning mirror device or the optical fiber bundle; however, the confocal pinhole effect at the scanning mirror device is low, which allows bright, deep images to be acquired.

The optical-scanning examination apparatus according to the above-described aspect may also include a galvano mirror. In this case, the first image is formed in the shape of a line; the plurality of mirrors, which can be selectively turned on and off, in the scanning mirror device are arrayed in at least one row; and the galvano mirror scans the light reflected at the mirrors constituting the scanning mirror device in a direction orthogonal to the arrayed direction of the mirrors.

With this configuration, since the excitation light is scanned in one direction by driving the scanning mirror device and the excitation light is scanned in a direction perpendicular thereto by the galvano mirror, it is possible to two-dimensionally scan the excitation light on the specimen. In this case, by forming the first intermediate image as a line, it is possible to focus the excitation light emitted from the light source unit into a narrower region compared to the case where a two-dimensional first intermediate image is formed.

According to the present invention, the resolution of acquired images can be freely adjusted with a simple configuration, which affords an advantage in that it is possible to adjust the examination depth and brightness of fluorescence images to match the purpose of examination.

DETAILED DESCRIPTION OF THE INVENTION

First Embodiment

A description will be given below of an optical-scanning examination apparatus according to an embodiment of the present invention, with reference to FIG. 1 and FIGS. 2A to 2D.

Figure 1:
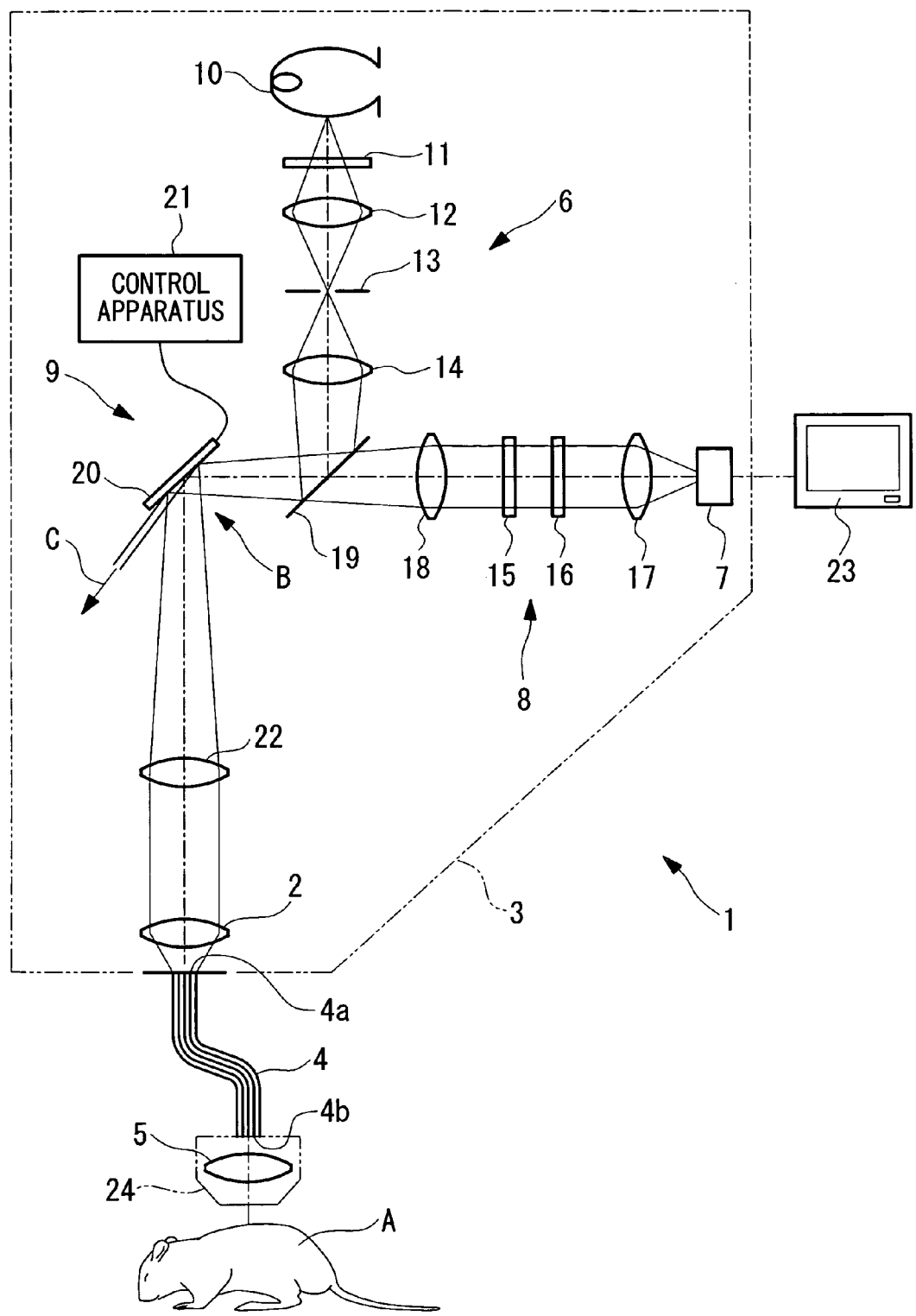
FIG. 1 is a diagram showing the overall configuration of an optical-scanning examination apparatus according to a first embodiment of the present invention.

As shown in FIG. 1, an optical-scanning examination apparatus 1 according to this embodiment includes an apparatus main body 3 provided with a first objective lens 2; an optical fiber bundle 4, one end 4a thereof being disposed at the image position of the first objective lens 2; and a second objective lens 5, which is disposed at another end 4b of the optical fiber bundle 4a and which images light emitted from the other end 4b onto a specimen A.

A light source unit 6 that emits excitation light, an imaging unit 8 that includes an imaging device 7, such as a photomultiplier, that images return light returning from the specimen A, and an optical scanning unit 9 that two-dimensionally scans the excitation light emitted from the light source unit 6 are provided in the apparatus main body 3.

The light source unit 6 includes a white-light source 10 such as a xenon lamp, an excitation filter 11 that transmits white light emitted from the white-light source 10 to produce excitation light of an excitation wavelength, a focusing lens 12 that focuses the excitation light radiated from the excitation filter 11, and a field stop 13 that limits the illumination region. The light source unit 6 also includes a focusing lens 14 that focuses the excitation light passing through the field stop 13 to form a first intermediate image.

The imaging unit 8 includes a barrier filter 15 that transmits return light, such as reflection light or fluorescence, returning from the specimen A and that blocks the excitation light; a photometric filter 16 for measuring the intensity of the return light; and a focusing lens 17 that images the return light onto the imaging device 7. The imaging unit 8 also includes a focusing lens 18 that converges the return light coming from the first intermediate image position B to convert it to a collimated beam.

The incident optical axis of the excitation light from the light source unit 6 and the optical axis of the imaging device 7 are disposed so as to intersect each other. A dichroic mirror 19 that selectively reflects the excitation light and transmits the other return light is placed at the intersection thereof.

As shown in FIGS. 2A to 2D, the optical scanning unit 9 is formed of a scanning mirror device 20, such as a digital micromirror device (DMD), which is formed of a plurality of minute mirrors 20a arrayed two-dimensionally. Each mirror 20a constituting the scanning mirror device 20 is selectively turned on and off in response to driving commands issued by an external control apparatus 21. When each mirror 20a is in the on state, excitation light incident from the light source 6 is reflected along the optical path directed towards the first objective lens 2, and the return light incident from the direction of the first objective lens 2 is reflected onto the optical path towards the imaging device 7. On the other hand, when each mirror 20a is placed in the off state, the excitation light and the return light are reflected in a direction away from these optical paths (in the direction of arrow C in FIG. 1).

The scanning mirror device 20 constituting the optical scanning unit 9 is disposed at the first intermediate image position B formed by the focusing lens 14. A first intermediate image of the white-light source 10 is incident simultaneously on the plurality of mirrors 20a and is reflected towards the first objective lens 2 by the mirrors 20a in the on state.

In the scanning mirror device 20, the state of each mirror 20a can be switched on and off with an arbitrary driving pattern under the control of the control apparatus 21, as mentioned above. For example, FIG. 2A shows a driving pattern of a given format, where a single mirror 20a, indicated by oblique shading X, is in the on state. By switching on the mirrors 20a in the sequence indicated by the arrow in this figure, it is possible to scan a single light spot over the specimen A in the same way as oscillating two galvano mirrors around two orthogonal axes to scan a light spot.

Figure 2C:
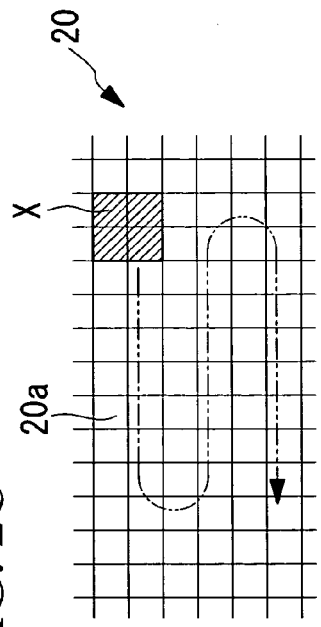
FIGS. 2A to 2D show driving patterns of a scanning mirror device of the optical-scanning examination apparatus in FIG. 1.
Figure 2D:
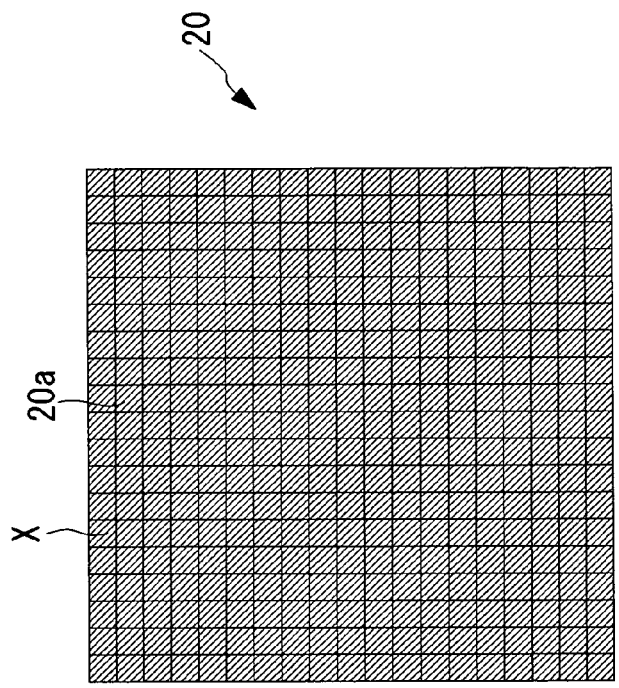
Figure 2A:
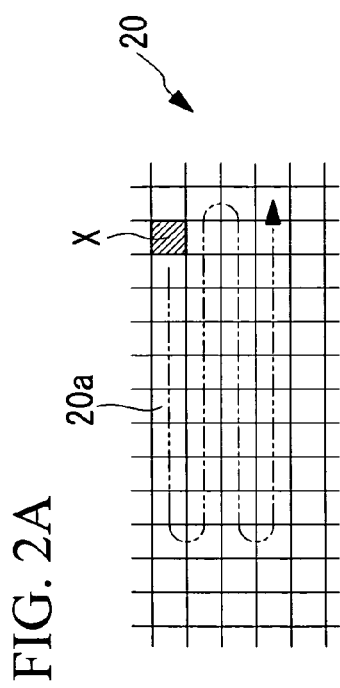
Figure 2B:
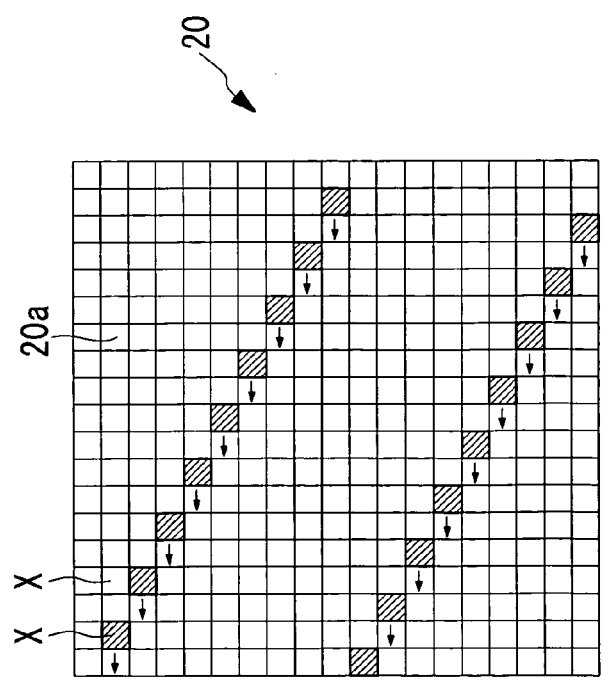

FIG. 2B shows an example driving pattern in which, within the mirrors 20a arranged in a square matrix, one mirrors 20a indicated by oblique shading X in all rows is sequentially turned on one at a time. The turned-on mirrors 20a in adjacent rows are disposed so as to be shifted in the row direction, and the turned-on mirrors 20a are switched in sequence in all rows, as indicated by the arrows in the figure, which allows two-dimensional scanning to be performed.

FIG. 2C shows an example driving pattern in which a plurality of adjacent mirrors 20a are simultaneously turned on. By changing the position of the plurality of simultaneously turned on mirrors 20a, indicated by the oblique shading X, in the manner indicated by the arrow, it is possible to two-dimensionally scan a large light spot on the specimen A.

Figure 3:
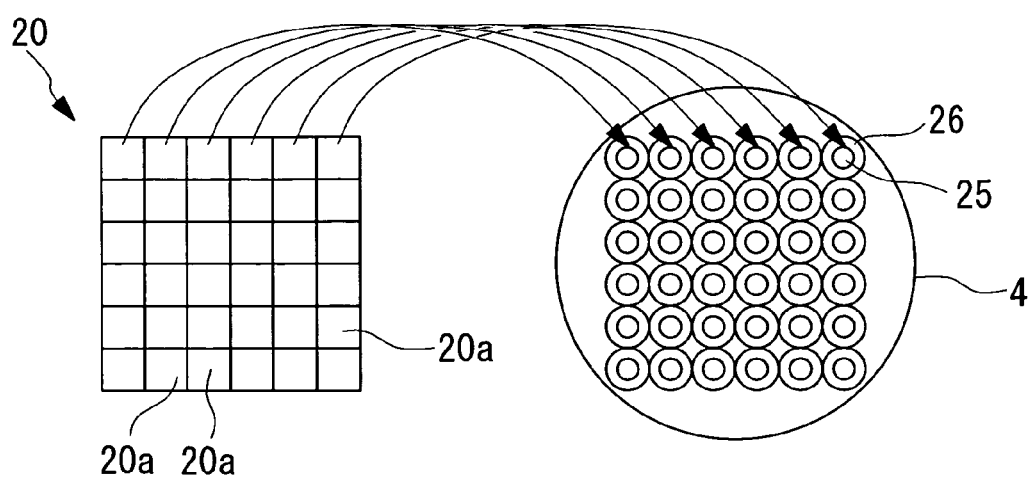
FIG. 3 is a diagram showing the correspondence between the scanning mirror device and fiber cores of an optical fiber bundle in the present invention.

Each mirror constituting the scanning mirror device 20 and a fiber core 25 of each optical fiber constituting the optical fiber bundle 4 are arranged in one-to-one correspondence, as shown in FIG. 3. With this configuration, when only a single mirror 20a is turned on, the excitation light reflected by that mirror 20a is made incident on a single predetermined fiber core 25. Also, the light emitted from a single fiber core 25 is incident on a single mirror 20a that is associated in advance with that fiber core 25, to be reflected therefrom.

Reference numeral 22 in the drawings represents an imaging lens positioned between the optical scanning unit 9 and the first objective lens 2. This imaging lens 22 converts the excitation light reflected at the optical scanning unit 9 into collimated light and introduces it to the first objective lens 2. Reference numeral 23 represents a monitor for displaying images captured by the imaging device 7.

The operation of the optical-scanning examination apparatus 1 according to this embodiment, having such a configuration, will now be described.

To carry out examination using the optical-scanning examination apparatus 1 of this embodiment, an operator freely moves a measuring head 24, provided with the second objective lens 5, with respect to the specimen A, to position the measuring head 24 at a suitable position for carrying out proper examination. Since the measuring head 24 is separated from the apparatus main body 3, which is relatively large, and is connected thereto by the optical fiber bundle 4, it can be placed at an appropriate position and orientation with respect to the specimen A by freely bending the optical fiber 4 as desired.

In this state, as shown in FIG. 2D, all mirrors 20a of the scanning mirror device 20 are turned on, and the excitation light emitted from the light source unit 6 is focused onto the scanning mirror device 20 by the focusing lens 14 to form a first intermediate image on the scanning mirror device 20. Since all mirrors 20a in the scanning mirror device 20 are turned on, the first intermediate image is reflected by the scanning mirror device 20 and is introduced into the optical fiber bundle 4 via the focusing lens 22 and the first objective lens 2.

Because each mirror 20a of the scanning mirror device 20 and each fiber core 25 of the optical fiber bundle 4 are arranged in one-to-one correspondence, the excitation light is transmitted by all of the fiber cores 25 and is imaged onto the specimen A by the second objective lens 5. Fluorescence produced at the specimen A passes back through the second objective lens 5, the optical fiber bundle 4, the first objective lens 2, the imaging lens 22, the scanning mirror device 20, the dichroic mirror 19, the focusing lens 18, the barrier filter 15, the photometric filter 16, and the focusing lens 17, and is captured by the imaging device 7.

In this case, since all mirrors 20a in the scanning mirror device 20 are turned on, no confocal effect is produced, which makes it difficult to observe only a fluorescence image from a focal position located at a certain depth inside the specimen A. However, since it is possible to obtain high-intensity, clear fluorescence images, and fluorescence emitted from a wide area in the depth direction is acquired by the imaging device 7, the operator can easily search for a desired examination site while looking at the monitor 23, and it is possible to focus at that examination site.

After checking of the examination site and focusing are completed, the operator switches to a measuring mode in which the scanning mirror device 20 is driven with a predetermined driving pattern under the control of the control apparatus 21.

For example, in the case of the driving pattern shown in FIG. 2A, when the excitation light emitted from the light source unit 6 is incident on the scanning mirror device 20 via the dichroic mirror 19, the excitation light is reflected at only the single mirror 20a that is turned on, and is made incident on the end of the corresponding fiber core 25 disposed at the end 4a of the optical fiber bundle 4 via the focusing lens 22 and the first objective lens 2. The excitation light transmitted in the optical fiber bundle 4 is then irradiated onto the specimen A via the second objective lens 5 and generates fluorescence in the specimen A.

The fluorescence produced in the specimen A returns to the scanning mirror device 20 via the second objective lens 5, the optical fiber bundle 4, the first objective lens 2, and the focusing lens 22. Fluorescence is produced at many locations in the specimen A and is incident on the second objective lens 5. However, since the fiber cores 25 at the end 4a of the optical fiber bundle 4 and each mirror 20a in the scanning mirror element 20 are located at conjugate positions where the intermediate images are formed, only the fluorescence emitted from a location at a predetermined depth in the specimen A is imaged by the imaging unit 7 due to the confocal pinhole effect. Therefore, in the same way as using a normal fixed confocal pinhole, it is possible to acquire detailed fluorescence images of the interior of the specimen over a wide area at a predetermined depth.

With the optical-scanning examination apparatus 1 according to this embodiment, since the fiber cores 25 of the optical fiber bundle 4 and the mirrors 20a of the scanning mirror device 20 are arranged in one-to-one correspondence, the excitation light reflected at the mirrors 20a of the scanning mirror device 20 can be made incident on the fiber cores 25 without impinging on cladding portions 26 of the optical fiber bundle 4. Therefore, an advantage is afforded in that the excitation light can be used efficiently without waste.

By using the driving pattern shown in FIG. 2B to change the on/off state of the mirrors 20a in the scanning mirror device 20, under the control of the control apparatus 21, multiple light spots are irradiated onto the specimen A simultaneously, similar to using a confocal disk. This allows the fluorescence from multiple locations to be imaged simultaneously. Therefore, an advantage is provided in that it is possible to quickly carry out fluorescence examination.

Furthermore, by using the driving pattern shown in FIG. 2C to change the on/off state of the mirrors 20a in the scanning mirror device 20, with the control unit 21, it is possible to scan the specimen A with a relatively large light spot.

In this case, the fluorescence emitted in the vicinity of the examination site away from the focal position located inside the specimen A can also pass through the end 4a of the optical fiber bundle 4 and the scanning mirror element 20. Therefore, although the confocal effect is reduced, on the other hand, the fluorescence intensity obtained at the imaging unit 7 is increased, which allows bright images to be acquired. In other words, this configuration is effective in applications where it is desired to carry out examination by means of bright fluorescence images, even though the resolution is somewhat low, and in applications where it is desired to acquire fluorescence images over a wide region in the depth direction.

In this way, with the optical scanning examination apparatus according to this embodiment, by controlling the on/off state of each mirror 20a constituting the scanning mirror device 20 in an arbitrary driving pattern using command signals from the control apparatus 21, it is possible to freely adjust the resolution of the obtained fluorescence images. At this time, when making the resolution lower, the fluorescence intensity is increased, which allows brighter images to be acquired, and it is therefore possible to carry out examination over a wide region in the depth direction.

In the optical scanning examination apparatus 1 according to this embodiment, each mirror 20a in the scanning mirror device 20 and each fiber core 25 in the optical fiber bundle 4 are placed in one-to-one correspondence; however, instead of this arrangement, a one-to-many or a many-to-one correspondence may also be used. When a one-to-many correspondence (for example, 1-to-4, 1-to-9, etc.) or a many-to-one correspondence (for example, 4-to-1, 9-to-1, etc.) is used, the resolution is reduced compared to the case of 1-to-1 correspondence; however, the intensity of the fluorescence obtained is increased, which allows bright fluorescence images to be acquired. Also, by making the ratio of the fiber cores 25 and the associated mirrors 20a with respect to the total number of mirrors 20a constant, it is possible to acquire uniform fluorescence images that do not exhibit light and dark areas.

In the optical-scanning examination apparatus 1 according to this embodiment, a device in which the white-light source 10, such as a xenon lamp or mercury lamp, and the excitation filter 11 are combined may be used as the light source unit 6; instead of this, however, a laser light source may be employed.

Second Embodiment

Figure 4:
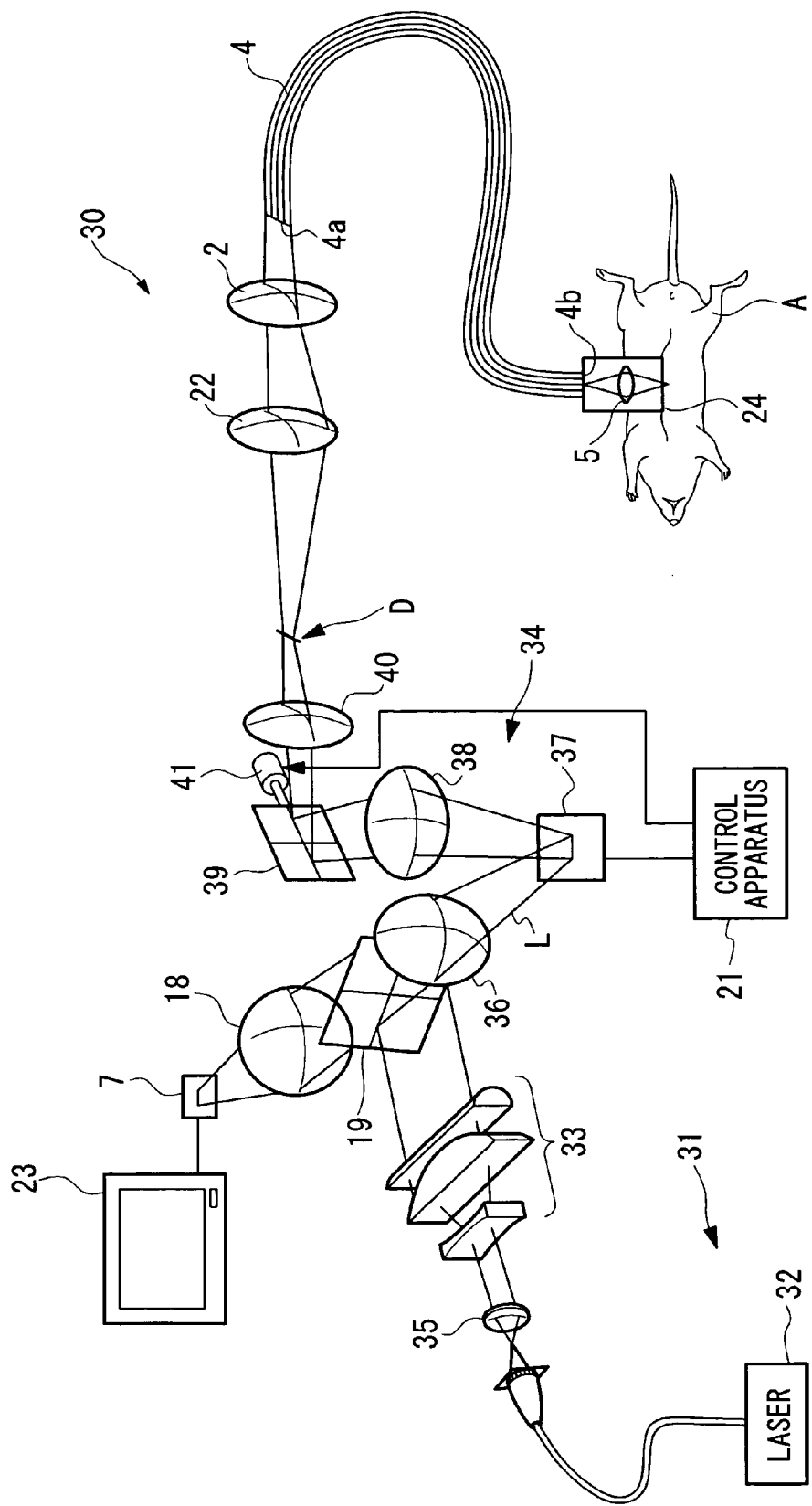
FIG. 4 is a diagram showing the overall configuration of an optical-scanning examination apparatus according to a second embodiment of the present invention.

Next, an optical-scanning examination apparatus 30 according to a second embodiment of the present invention will be described below with reference to FIG. 4.

In the description of this embodiment, the same reference numerals are assigned to parts having the same configuration as in the optical-scanning examination apparatus according to the first embodiment described above, and a description thereof is omitted.

The optical-scanning examination apparatus 30 according to this embodiment differs from the optical-scanning examination apparatus according to the first embodiment in that a light source unit 31, including a laser light source 32 and a cylindrical lens 33, produces a band of collimated light, and the structure of an optical scanning unit 34 is different.

The light source unit 31 includes a collimator lens 35, which converts the laser light emitted by the laser light source 32 into a collimated beam.

The optical scanning unit 34 includes a scanning mirror device 37 that reflects the band of laser light emitted by the light source unit 31 at a first intermediate image position B of a focusing lens 36; a collimator lens 38 that converts the laser light reflected at the scanning mirror device 37 into a band of collimated light; a galvano mirror 39 that reflects the band of collimated light emitted from the collimator lens 38; and a pupil projection lens 40 that focuses the laser light reflected by the galvano mirror 39 to form a third intermediate image at a third intermediate image position D.

Figure 5:
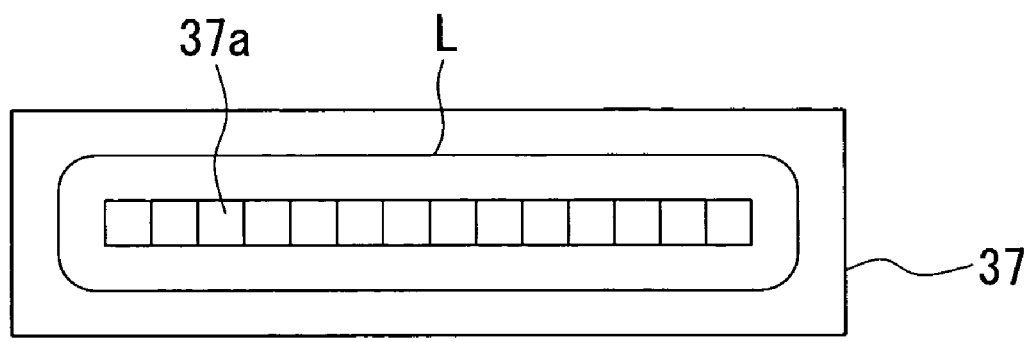
FIG. 5 is a diagram showing a scanning mirror device of the optical-scanning examination apparatus in FIG. 4.

As shown in FIG. 5, the scanning mirror device 37 includes a plurality of mirrors 37a disposed in a row at the position where the band of laser light L is incident simultaneously. By sequentially changing the on/off state of each mirror 37a in the arrayed direction, the laser light L can be scanned in one direction.

The galvano mirror 39 is rotated by a motor 41 about an axis positioned within the horizontal plane in which the laser light L is scanned by the scanning mirror device 37. With this configuration, the laser light L scanned in one direction by the scanning mirror device 37 can be scanned in a direction perpendicular thereto by the galvano mirror 39.

In other words, with this embodiment too, the laser light is scanned in two dimensions by the optical scanning unit 34 to be made incident on the end 4a of the optical fiber bundle 4.

With the optical-scanning examination apparatus according to this embodiment, having such a configuration, by combining the scanning mirror device 37, which is formed of a single row of arrayed mirrors, and the single-axis galvano mirror 39, it is possible to scan the specimen A in two dimensions with a simple configuration. In this case, compared to the case where scanning is performed with two galvano mirrors, because the band of collimated light is made incident on the scanning mirror device 37, the intensity of the laser light L reflected by the individual mirrors 37a making up the scanning mirror device 37 can be increased. Therefore, high-intensity laser light L can be made incident on the specimen A, which allows bright fluorescence images to be obtained.

Figure 6:
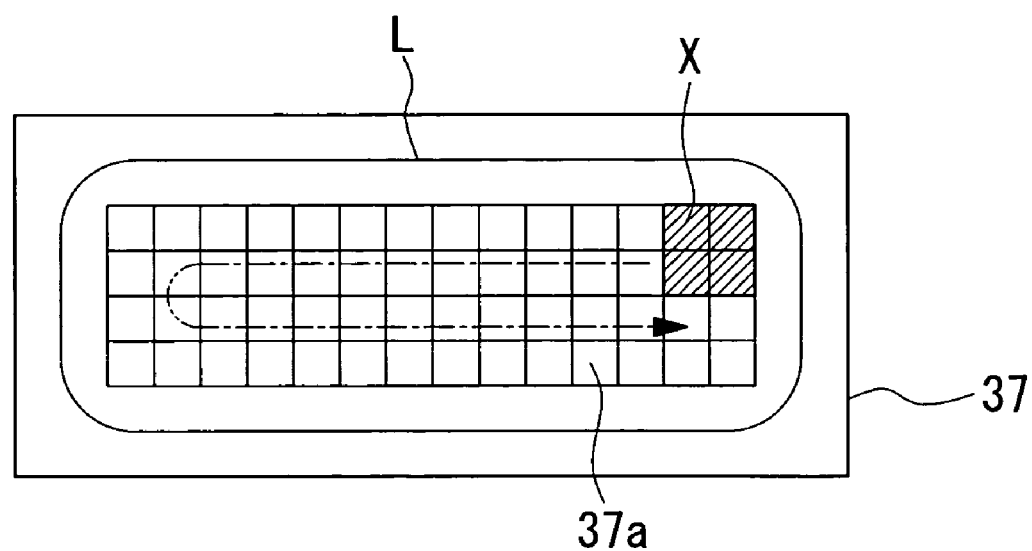
FIG. 6 is a diagram showing a modification of FIG. 5.

In the optical-scanning examination apparatus 30 according to this embodiment, a device having a single row of arrayed mirrors 37a is used as the scanning mirror device 37; however, instead of this, a device having two or more rows of mirrors may be employed, as shown in FIG. 6 (for example, four rows are shown in FIG. 6). Thus, by arbitrarily selecting the mirrors 37a in the on state simultaneously (for example, by selecting four mirrors, as shown by the oblique shading X in FIG. 6), it is possible to achieve the same advantages as the optical-scanning examination apparatus 1 according to the first embodiment.

Third Embodiment

A description of an optical-scanning confocal examination apparatus according to a third embodiment of the present invention will be given below with reference to FIGS. 7 and 8.

Figure 7:
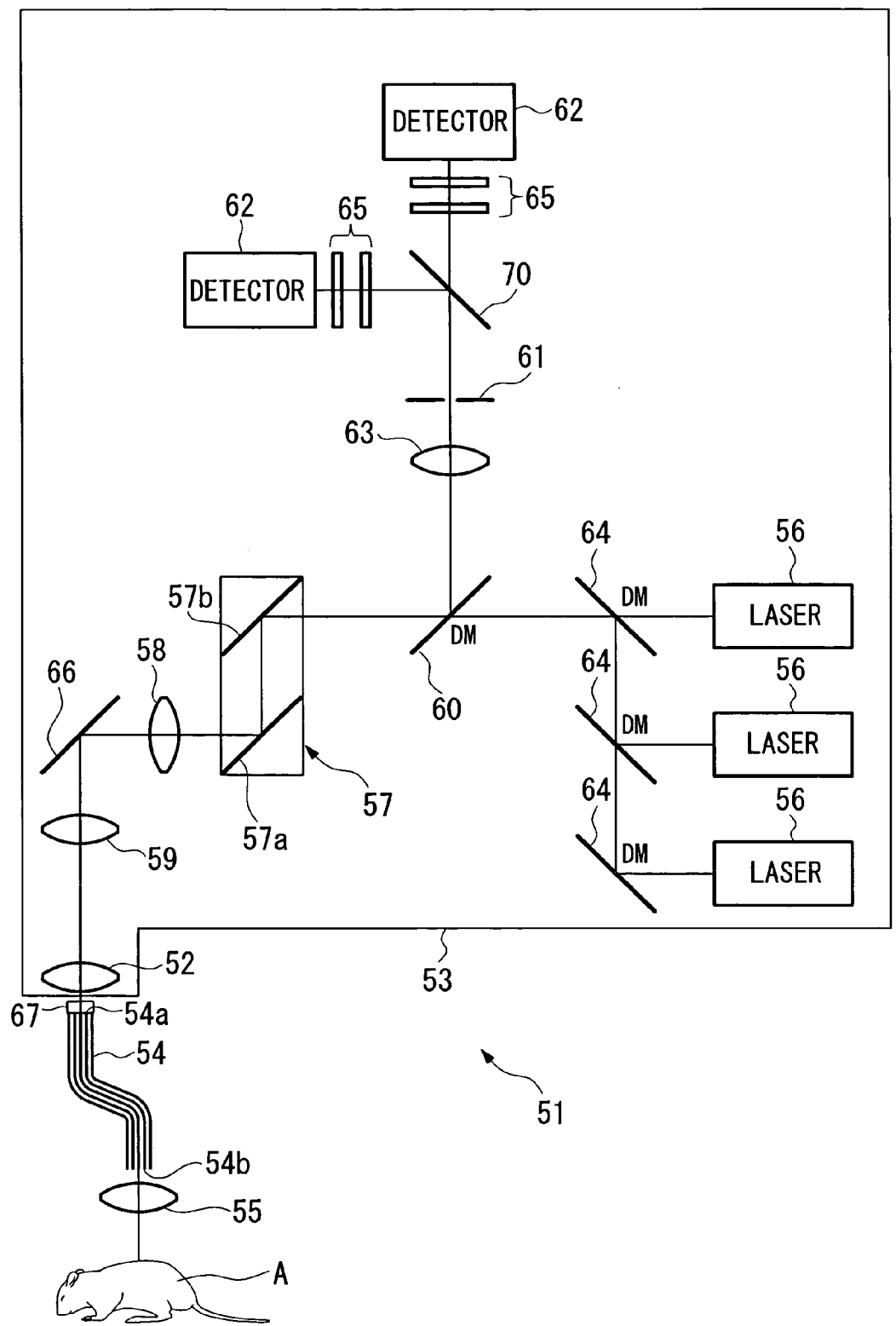
FIG. 7 is a diagram showing the overall configuration of a laser-scanning confocal examination apparatus according to a third embodiment of the present invention.

As shown in FIG. 7, an optical-scanning confocal examination apparatus 51 according to this embodiment, which is a laser-scanning confocal microscope, includes an apparatus main body 53 having a first objective lens 52; an optical fiber bundle 54 of which one end 54a is disposed at an image position of the first objective lens 52; and a second objective lens 55, which is disposed at the other end 54b of the optical fiber bundle 54 and which images the light emitted from the other end 54b onto a specimen A.

The apparatus main body 53 contains laser light sources 56 that generate laser light; an optical scanning unit 57, formed of two galvano mirrors 57a and 57b that can be oscillated around two orthogonal axes, that two-dimensionally scans the laser light emitted from the laser light sources 56 onto the end 54a of each optical fiber constituting the optical fiber bundle 54; a pupil projection lens 58; an imaging lens 59; a dichroic mirror 60 that splits off returning laser light that returns via the first objective lens 52; a confocal pinhole 61 disposed at the conjugate position of the end 54a of the optical fiber bundle 54; and an optical detector 62 that detects light passing through the confocal pinhole 61. Reference numeral 63 in the figure represents a confocal lens.

In this figure, a plurality of laser light sources 56 is provided, to allow the specimen A to be irradiated with laser light of different wavelengths; however, a single laser light source 56 may be used. Also, a plurality of optical detectors 62 is shown as an example, but a single optical detector 62 may be used. Reference numerals 64 and 70 represent dichroic mirrors, and reference numeral 65 represents a bandpass filter. Also, reference numeral 66 represents a light-path folding mirror.

The light emitted from the other end 54b of the optical fiber bundle 54 serves as a light source for the second objective lens 55 and is imaged at a desired location on the specimen A.

Figure 8:
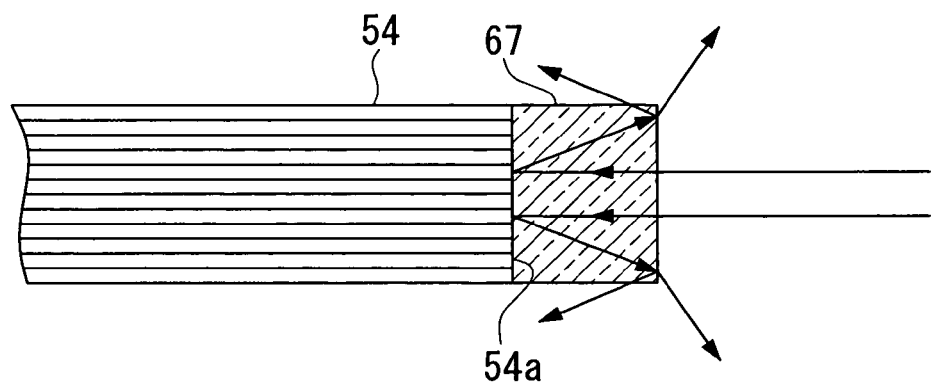
FIG. 8 is a diagram for explaining a glass plate positioned at one end of an optical fiber bundle in the laser-scanning confocal examination apparatus in FIG. 7.

As shown in FIG. 8, a glass plate 67 is fixed to the end 54a of the optical fiber bundle 54. This glass plate 67 has a desired thickness, for example, a thickness of about 2 mm. The glass plate 67 is placed in contact with the end 54a of the optical fiber bundle 54 so as to abut the end 54a (physical contact). An adhesive with substantially the same refractive index as the glass plate 67 and the core of each fiber making up the optical fiber bundle 54 is preferably provided between the glass plate 67 and the end 54a of the optical fiber bundle 54, ideally without an air gap.

The operation of the optical-scanning confocal examination apparatus 51 of this embodiment, having such a configuration, will be described below.

With the optical-scanning confocal examination apparatus 51 of this embodiment, when laser light is emitted from the laser light sources 56, the laser light passes through the dichroic mirrors 64 and 60 and is made incident on the optical scanning unit 57 to be scanned in two dimensions. The irradiated laser light deflected by the optical scanning unit 57 is made incident on the end 54a of the optical fiber bundle 54 via the pupil projection lens 58, the mirror 66, the focusing lens 59, and the first objective lens 52.

The laser light incident on the end 54a of the optical fiber bundle 54 and transmitted through the optical fiber bundle 54 diverges from the other end 54b of the optical fiber bundle 54 and is irradiated onto an examination site of the specimen A by the second objective lens 55 disposed at the subsequent stage. Fluorescence is emitted from the examination site of the specimen A irradiated with this laser light, and the fluorescence returns via the second objective lens 55, the optical fiber bundle 54, the first objective lens 52, the focusing lens 59, the mirror 66, the pupil projection lens 58, and the optical scanning unit 57, is reflected by the dichroic mirror 60, and is split off from the laser light. Thereafter, only the light focused by the confocal lens 63 and passing through the confocal pinhole 61 is detected by the optical detector 62. Since the end 54a of the optical fiber bundle 54 functions as a confocal pinhole and is disposed at a conjugate position of the confocal pinhole 61, only the light emitted from the end 54a of the optical fiber bundle 54 is allowed to pass through the confocal pinhole 61 to be detected by the optical detector 62.

In this case, the light made incident on the end 54a of the optical fiber bundle 54 by the first objective lens 52 is incident from the surface of the glass plate 67 before being introduced to the end 54a. Therefore, since the glass plate 67 and the cores of the optical fiber bundle 54 are bonded without an air gap therebetween, the light passes through the interface between media having the same refractive indexes. In this case, there is substantially no reflection of the laser light at the interface. Only slight reflection of the laser light occurs, but since the reflected laser light is scattered by the glass plate 67, as shown by the arrow in FIG. 8, the reflected light returning to the first objective lens 52 is extremely small. Therefore, since little returning laser light reflected at the end 54a of the optical fiber bundle 54, serving as a confocal pinhole, is produced and the weak reflected laser light is scattered anyway, any flare in the fluorescence images detected by the optical detector 62 as a result of the reflected light is low. Therefore, it is possible to obtain detailed fluorescence images.

When the laser light is incident on the surface of the glass plate 67 from the air, it is transmitted through the interface between media having different refractive indices, and therefore, part of the light is reflected at the surface of the glass plate 67. However, since the glass plate has a certain thickness, that part of the light is kept away, in the optical axis direction, from the end 54a of the optical fiber bundle 54 functioning as a confocal pinhole. Therefore, even though it returns towards the optical detector 62, it is not possible for most of the reflected light produced at the surface of the glass plate 67 to be transmitted through confocal pinhole 61 disposed at the stage before the optical detector 62, thus preventing it from being detected by the optical detector 62.

In other words, with the laser-scanning confocal microscope according to this embodiment, the occurrence of flare can be prevented, which allows detailed fluorescence images to be acquired and improves the examination accuracy.

Figure 9:
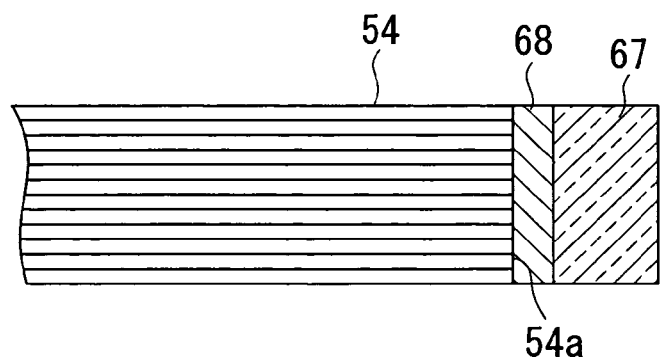
FIG. 9 shows a modification of FIG. 8.

In the optical-scanning confocal examination apparatus 51 according to this embodiment, the glass plate 67 is disposed at the end 54a of the optical fiber bundle 54 so as to be directly bonded thereto; instead of this, however, as shown in FIG. 9, they may be connected together by means of a transparent adhesive 68. With this configuration, it is possible to more reliably prevent the formation of an air gap between the glass plate 67 and the end 54a of the optical fiber bundle 54, which allows the occurrence of reflected light at the end 54a of the optical bundle 54 to be suppressed.

Figure 10:
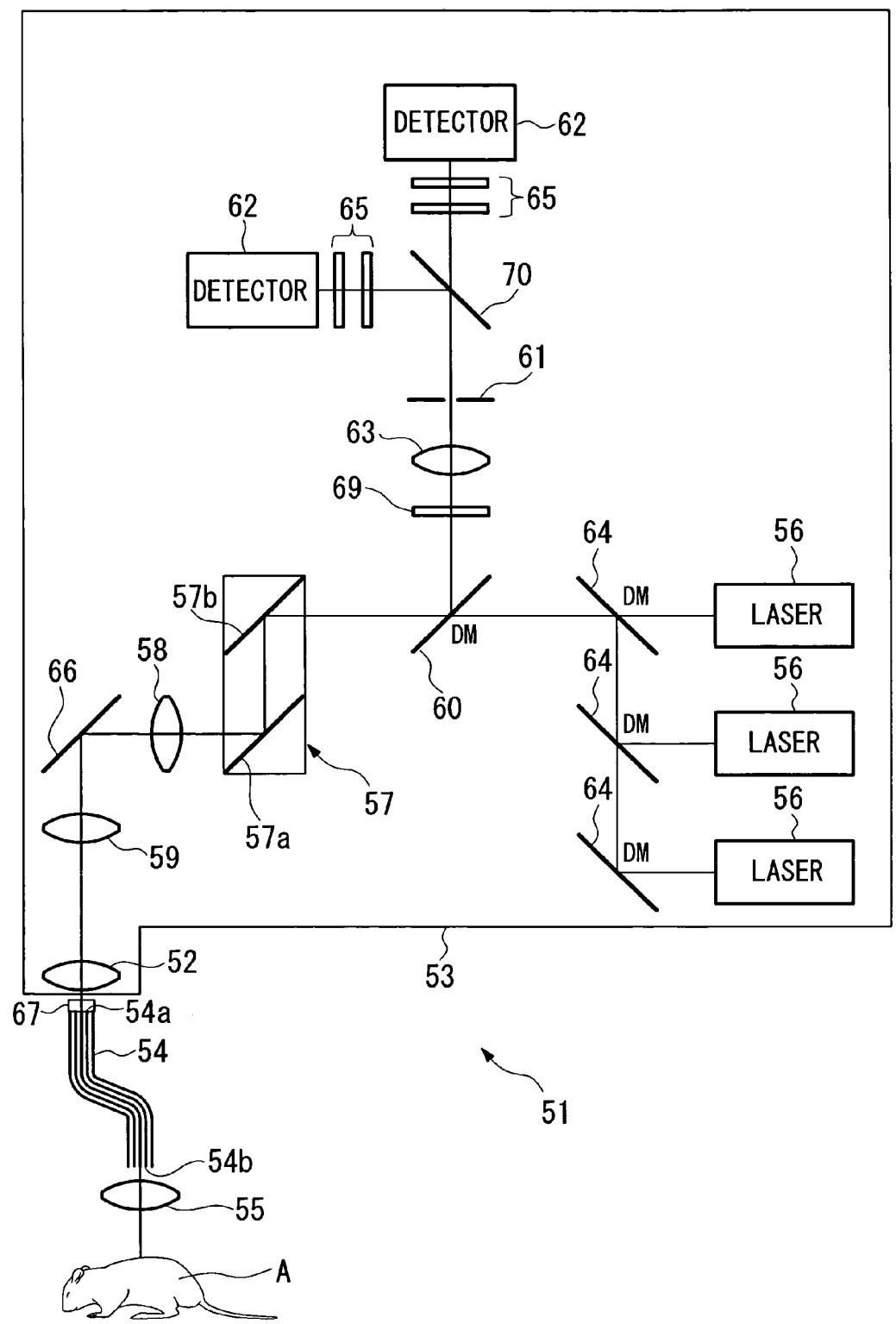
FIG. 10 is a diagram showing the overall configuration of a laser-scanning confocal examination apparatus having a barrier filter in addition to the glass plate in FIG. 7.

Furthermore, instead of the glass plate 67 disposed at the end 54a of the optical fiber bundle 54, as shown in FIG. 10, a barrier filter 69 for cutting reflected laser light may be disposed in the region from the end 54a of the optical fiber bundle 54 to the optical detector 62.

Figure 11:
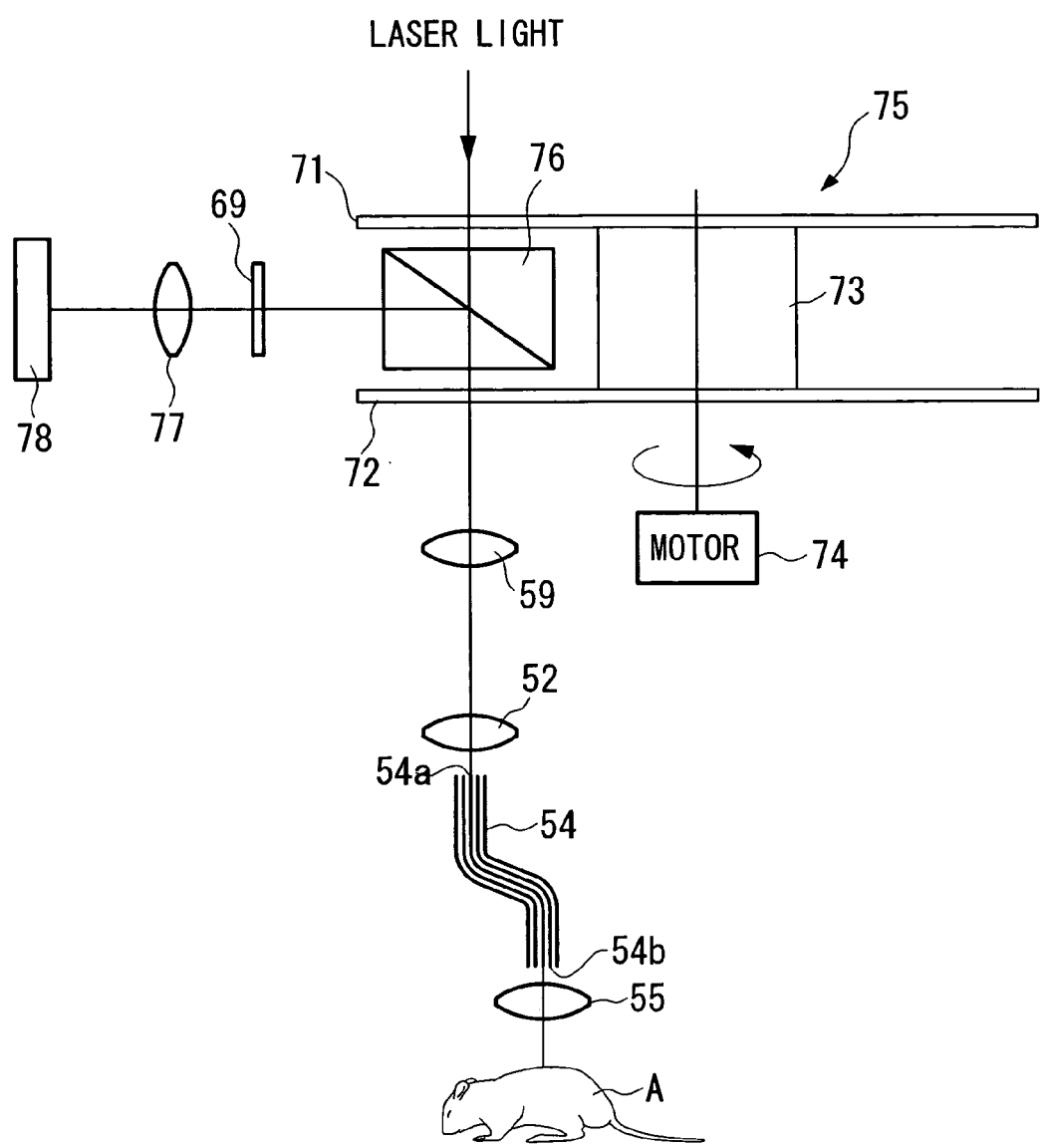
FIG. 11 is a diagram showing the overall configuration of a modification of the optical scanning unit in the laser-scanning confocal examination apparatus in FIG. 7.

With the optical-scanning confocal examination apparatus according to this embodiment, the optical scanning unit 57 formed of the galvano mirrors 57a and 57b is provided; instead of this, however, as shown in FIG. 11, a confocal scanner 75 in which a focusing disk 71 and a pinhole disk 72 are connected by a drum 73 and rotatably driven by a motor 74 may be used. The focusing disk 71 includes a plurality of Fresnel lenses formed on one side of a substrate, and the Fresnel lenses are arranged so as to be sequentially staggered in the radial direction by a certain distance. The pinhole disk 72 has a plurality of pinholes in a substrate, and the pinholes are arranged so as to be sequentially staggered in the radial direction by a certain distance. A beamsplitter 76 is disposed between the focusing disk 71 and the pinhole disk 72, and returning fluorescence passing through pinholes in the pinhole disk 72 is split off by the beamsplitter 76 and is imaged by a camera 78, via the barrier filter 69 and the focusing lens 77.

By using the confocal scanner 75, the laser light emitted from the laser light source 56 passes through a plurality of pinholes simultaneously, thus allowing the specimen A to be scanned with multiple spots of laser light. It is therefore possible to acquire fluorescence images of the specimen A at high speed. In this case, since the reflected light is blocked at the end 54a of the optical fiber bundle 54, it is possible to sufficiently reduce the level of flare occurring in the fluorescence images captured by the camera 78.

Additional Items

The following configurations are derived from the third embodiment described above.

Additional Item 1

The invention may also provide an optical-scanning confocal examination apparatus including an apparatus main body that scans light from a light source and focuses the light with a first objective lens; an optical fiber bundle of which one end is disposed at the focal position of the first objective lens; a second objective lens, disposed at the other end of the optical fiber bundle, for focusing the light emitted from the other end of the optical fiber bundle onto a specimen; a confocal pinhole, disposed at the conjugate position of the one end of the optical fiber bundle, that allows return light returning from the specimen via the second objective lens, the optical fiber bundle, and the first objective lens to pass therethrough; and an imaging unit that images the light passing through the confocal pinhole. In addition, a glass plate of predetermined thickness is disposed on the one end of the optical fiber bundle.

According to this aspect of the invention, since the apparatus main body and the second objective lens are connected by the optical fiber bundle, the position and angle of the second objective lens can be freely set by bending the optical fiber bundle. Also, by disposing the second objective lens at the end of the optical fiber bundle, the end portion can be reduced in size and can thus be easily positioned at a narrow examination site or in a small specimen, such as a small experimental animal.

The light emitted from the light source and focused at the end of the optical fiber bundle by the first objective lens is incident on the end of the optical fiber bundle after becoming incident on the glass plate disposed at the end of the optical fiber bundle. The light incident on the optical fiber bundle is then transmitted through the optical fiber bundle and is focused on the specimen by the second objective lens. Light emitted from the specimen then returns via the second objective lens, the optical fiber bundle, and the first objective lens, and passes through the confocal pinhole to be imaged by the imaging unit. Since the end of the optical fiber and the confocal pinhole are placed at conjugate positions, only the light transmitted through the end of the optical fiber bundle is imaged by the imaging unit.

In this case, the light propagating towards the end of the optical fiber bundle from the first objective lens is partially reflected when entering the glass plate; however, since the glass plate has a certain thickness, most of the light reflected at the surface of the glass plate cannot pass through the confocal pinhole. Also, if the glass plate and the end of the optical fiber bundle are bonded together, the light incident on the optical fiber bundle from the glass plate is transmitted since these media have the same refractive indices, and therefore, substantially no reflected light is produced. On the other hand, if the glass plate and the end of the optical fiber bundle are not bonded together, some reflected light is produced; however, even in this case, the reflected light is scattered when being emitted back into the air from the surface of the glass plate, and therefore, almost none of it passes through the confocal pinhole, in the same way as described above. As a result, among the reflected light at the glass plate or end of the optical fiber bundle, the reflected light imaged by the imaging means is reduced, which allows low-noise images to be acquired.

Additional Item 2

In the optical-scanning confocal examination described in Additional Item 1 above, the glass plate may be bonded to the end of the optical fiber bundle.

By doing so, it is possible to eliminate an air gap between the glass plate and the end of the optical fiber bundle, which allows the amount of reflected light to be reduced even further.

Additional Item 3

The present invention may also provide an optical-scanning confocal examination apparatus including an apparatus main body that scans light from a light source and focuses the light with a first objective lens; an optical fiber bundle of which one end is disposed at the focal position of the first objective lens; a second objective lens, disposed at the other end of the optical fiber bundle, that focuses the light emitted from the other end of the optical fiber bundle onto a specimen; a confocal pinhole which is disposed at a conjugate position of the one end of the optical fiber bundle and which allows return light returning from the specimen via the second objective lens, the optical fiber bundle, and the first objective lens to pass therethrough; and an imaging unit that images the light passing through the confocal pinhole. In addition, a barrier filter that blocks reflected light from the end of the optical fiber bundle is provided between the one end of the optical fiber bundle and the imaging unit.

According to this aspect of the invention, since reflected light from the end of the optical fiber bundle is blocked by the action of the barrier filter, it is possible to acquire images having low noise, such as flare caused by reflected light, in the same way as described above. Apart from a transparent-type barrier filter, the barrier filter may be an optical element having barrier characteristics placed in the light path from the end of the optical fiber bundle to the imaging unit.

According to the aspects of the invention described in each of the above-mentioned Additional Items, it is possible to freely position and finely adjust the second objective lens at the tip by means of the optical fiber bundle, and it is possible to prevent reflected light at the end of the optical fiber bundle from being detected as noise, such as flare, by the imaging unit. Therefore, an advantage is afforded in that it is possible to acquire detailed, low-noise images.

Fourth Embodiment

Figure 12:
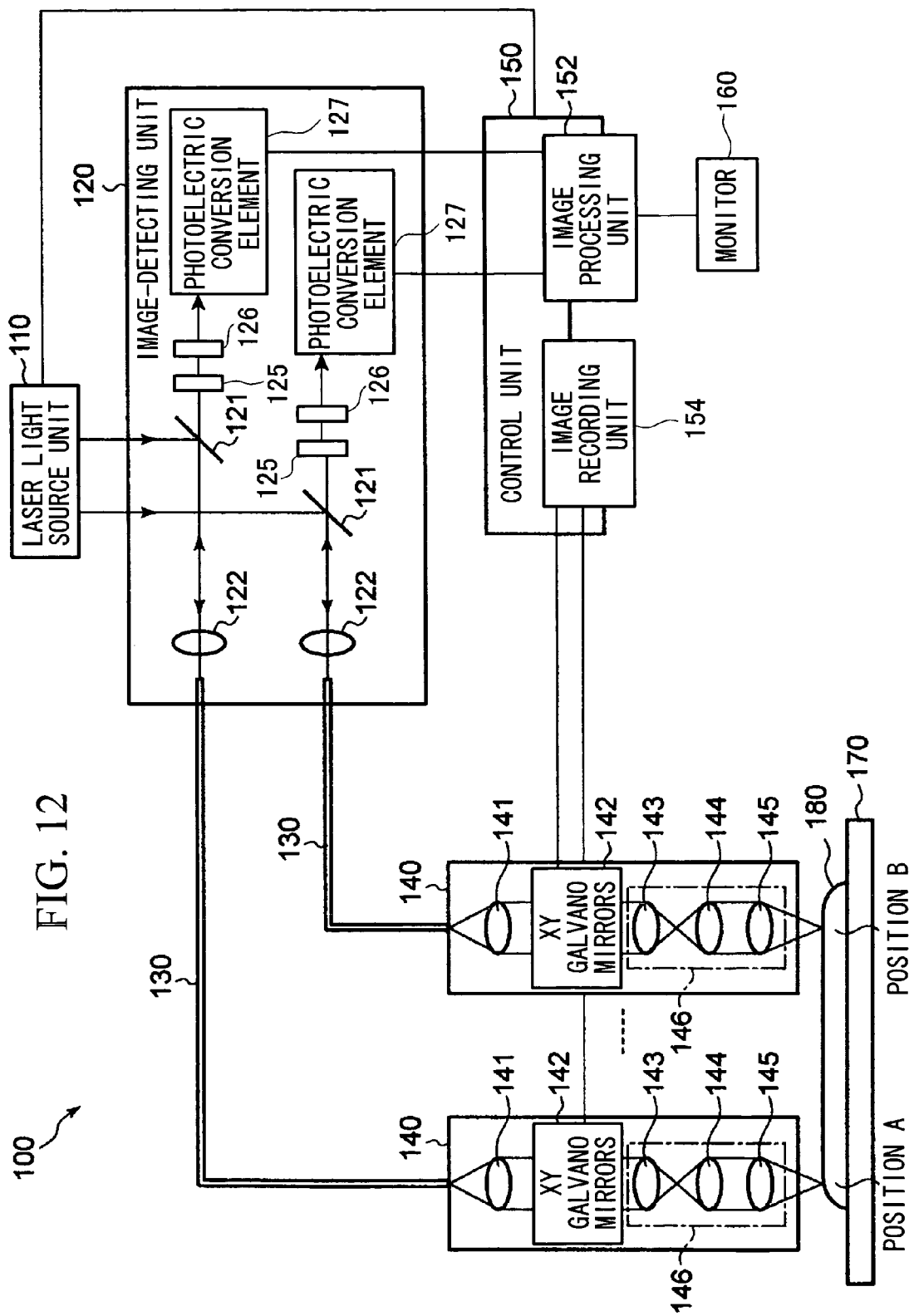
FIG. 12 schematically shows the configuration of an examination apparatus according to a fourth embodiment of the present invention.

FIG. 12 shows a schematic diagram of an examination apparatus according to a fourth embodiment of the present invention.

As shown in FIG. 12, an examination apparatus 100 of this embodiment includes a stage 170 for carrying a specimen 180 (for example, an experimental animal such as a mouse); a laser light source unit 110 that generates a plurality of laser beams; a plurality of optical irradiation/detection units 140 that irradiate the plurality of light beams onto the specimen 180 and detect light from the specimen 180; an image-detecting unit 120 that photoelectrically converts the light beams emitted from the plurality of light irradiation/detection unit 140 to generate an image signal; a plurality of optical fibers 130 that optically connect the image-detecting unit 120 and the plurality of light irradiation/detection units 140; a control unit 150 for controlling the overall apparatus; and a monitor 160 for displaying examination information such as images.

The laser light source unit 110 if formed, for example, of a plurality of lasers and optical elements and can emit laser beams of a plurality of wavelengths. The laser light source unit 110 may be formed of one laser and an optical element that splits the output laser light into a plurality of light beams so as to emit laser beams having the same wavelength.

The light irradiation/detection units 140 each include a collimator lens 141, XY galvano mirrors 142, a pupil lens 143, an imaging lens 144, and an objective lens 145. The pupil lens 143, the imaging lens 144, and the objective lens 145 constitute an optical system 146 for irradiating a converging laser beam onto the specimen 180 and for detecting detection light produced by the specimen 180 in response to the irradiated laser light. The collimator lens 141 is for optically coupling with the optical fiber 130; the collimator lens 141 guides the laser light from the optical fiber 130 to the optical system 146 via the XY galvano mirrors 142 and also converges the light beam detected by the optical system 146 to introduce it back into the optical fiber 130. The XY galvano mirrors 142 include a mirror that can oscillate about the X-axis and a mirror that can oscillate about the Y-axis, which allows the incident light beam to be two-dimensionally scanned in the X-axis and Y-axis directions. By doing so, it is possible to two-dimensionally scan the spot (region that generates detection light) of the laser beam emitted from the light irradiation/detection unit 140. In other words, the XY galvano mirrors 142 constitute a scanning unit for scanning the region that generates detection light, which is photoelectrically converted by the image-detection unit 120. However, the detection unit is not limited to XY galvano mirrors; another scanning mechanism that scans a light beam may also be used.

The image-detection unit 120 includes excitation dichroic mirrors 121, collimator lenses 122, confocal pinholes 125, filters 126, and photoelectric conversion elements 127. The excitation dichroic mirrors 121 selectively reflect only light of specific wavelengths from the laser light emitted by the laser light source unit 110 and transmit light of other wavelengths. The collimator lenses 122 are for optically coupling to the optical fibers 130; the collimator lenses 122 converge the laser beams from the excitation dichroic mirrors 121 to introduce the laser beams into the optical fibers 130 and also guide light from the optical fibers 130 to the excitation dichroic mirrors 121. The confocal pinholes 125 are placed in confocal positional relationship with the spots (regions that generate detection light) of the laser beams irradiating the specimen 180, so as to selectively allow only light from the vicinity of the spots (regions that generate detection light) to pass therethrough and to block light from other parts. The confocal pinholes 125 are provided for acquiring confocal images, but they may be omitted if it is not necessary to acquire confocal images. The filters 126 selectively transmit only light of the wavelengths desired to be detected, and block light of unwanted wavelengths. The photoelectric conversion elements 127 are formed, for example, of PMTs (photomultipliers) or PDs (photodiodes); they function as photoelectric conversion devices for photoelectrically converting the detection light and photoelectrically convert the light transmitted through the filters 126 to generate an image signal of one pixel. Each of the excitation dichroic mirrors 121 and each of the filters 126 can be changed among a plurality of excitation dichroic mirrors and a plurality of filters, respectively, using electric motors, and one of a plurality is selectively placed in the optical path. FIG. 12 shows only one placed in the optical path, however.

The control unit 150 includes an image processing unit 152 for processing the image signal produced in the image-detecting unit 120 to form an image and an image recording unit 154 that records the image formed in the image processing unit 152. The control unit 150 is also provided with a function for controlling the XY galvano mirrors 142 constituting the scanning unit. The control unit 150 is formed, for example, of a computer and a dedicated expansion board.

The monitor 160 is formed, for example, of a CRT and functions as an image display apparatus for displaying images formed in the image processing unit.

As a representative example, two light irradiation/detection units 140 are shown in FIG. 12; however, the examination apparatus 100 may include two or more light irradiation/detection units 140. In addition, corresponding to the two light irradiation/detection units 140, two optical systems (the excitation dichroic mirrors 121, the collimator lenses 122, the confocal pinholes 125, the filters 126, and the photoelectric conversion elements) for photoelectrically converting the light detected in the light irradiation/detection units 140 are depicted in the image-detecting unit 120; however, the image-detecting unit 120 may be provided with the same number of optical systems as the number of light irradiation/detection units 140, or more. In other words, the image-detecting unit 120 can be connected to a plurality of light irradiation/detection units 140.

The image-detecting unit 120 in FIG. 12 is configured to detect only light of one wavelength per laser beam; however, it may be configured to detect light of a plurality of wavelengths per laser beam. In this case, the image-detecting unit 120 selectively reflects light of specific wavelengths, but it may include a beamsplitter that transmits light of other wavelengths in the optical path between the confocal pinhole 125 and the filter 126, and it may include an additional filter 126 and photoelectric conversion element 127 in the light path split off by the beamsplitter.

Next, an examination procedure using the examination apparatus 100 of this embodiment will be described.

The laser light source unit 110 emits laser beams of a specified wavelength or wavelengths and with a specified intensity, according to settings from the control unit 150. The laser beams emitted from the laser light source unit 110 are introduced to the image-detecting unit 120. The laser beams introduced to the image-detecting unit 120 are reflected by the excitation dichroic mirrors 121, are converted to converging laser beams by the collimator lenses 122, and are introduced to the optical fibers 130. The laser beams introduced into the optical fibers 130 are transmitted through the optical fibers 130, and are emitted from the optical fibers 130 to be incident on the light irradiation/detection units 140. The laser beams entering the light irradiation/detection units 140 are converted to collimated beams by the collimator lenses 141 and are incident on the XY galvano mirrors 142. The laser beams reflected by the XY galvano mirrors 142 are converted to converging beams by the optical systems 146 formed of the pupil lenses 143, the imaging lenses 144, and the objective lenses 145, and are irradiated onto the specimen 180. The laser beams irradiated onto the specimen 180 form spots at the focal planes (examination planes) of the optical systems 146. The XY galvano mirrors 142 scan the laser beams horizontally and vertically so that the laser beam spots are scanned over the examination planes (focal planes of the optical systems 146) in the specimen 180.

If the specimen 180 receiving the laser light is a fluorescent specimen, it generates fluorescence as the detection light, and if it is a reflective specimen, it produces reflected light as the detection light. The fluorescence is then guided to the image-detecting unit 120 via the objective lenses 145, the imaging lenses 144, the pupil lenses 143, the XY galvano mirrors 142, the collimator lenses 141, and the optical fibers 130. The detection light beams introduced into the image-detecting unit 120 are converted to collimated beams by the collimator lenses 122 and are incident on the excitation dichroic mirrors 121. Since the excitation dichroic mirrors 121 have a characteristic whereby they transmit the detection light wavelengths, the detection light passes through the excitation dichroic mirrors 121. In the detection light passing through the excitation dichroic mirrors 121, only light from the vicinity of the spots on the examination plane passes through the confocal pinholes 125. Light of unwanted wavelengths is removed from the detection light passing through the confocal pinholes 125 by the filters 126, and the remaining light is incident on the photoelectric conversion elements 127. The detection light incident on the photoelectric conversion elements 127 is photoelectrically converted to output image signals to the control unit 150.

The image-processing unit 152 in the control unit 150 subjects the luminance data of the detection light output from the image-detecting unit 120 as the image signals to analog-to-digital conversion, and arranges the luminance data based on horizontal synchronization and vertical synchronization. By outputting the arranged luminance data to the monitor 160 to display an image, an image of the examination location on the specimen 180 can be formed. Also, since the control unit 150 can synchronize signals from the plurality of photoelectric conversion elements 127 to process them, it is possible to form simultaneous images of multiple positions on the specimen (for example, position A and position B). In other words, separate positions on the specimen A can be simultaneously examined.

FIG. 12 shows an example in which separate positions on the specimen are simultaneously examined with the plurality of light irradiation/detection units 140; however, it is of course possible to simultaneously examine the same position on the specimen with the plurality of light irradiation/detection units 140.

All of the plurality of light irradiation/detection units 140 need not be used for the same type of examination; they may be used for different types of examination. In other words, the plurality of light irradiation/detection units 140 may include multiple types of light irradiation/detection units 140. For example, the plurality of light irradiation/detection units 140 may include light irradiation/detection units designed for fluorescence examination and light irradiation/detection units designed for reflection examination. With this configuration, it is possible to carry out fluorescence examination and reflection examination simultaneously. In this case, for example, reflection examination can be carried out in the image-detecting unit 120 by detecting the same wavelength as that of the laser light, and fluorescence examination can be carried out by detecting different wavelengths from that of the laser light.

Figure 13:
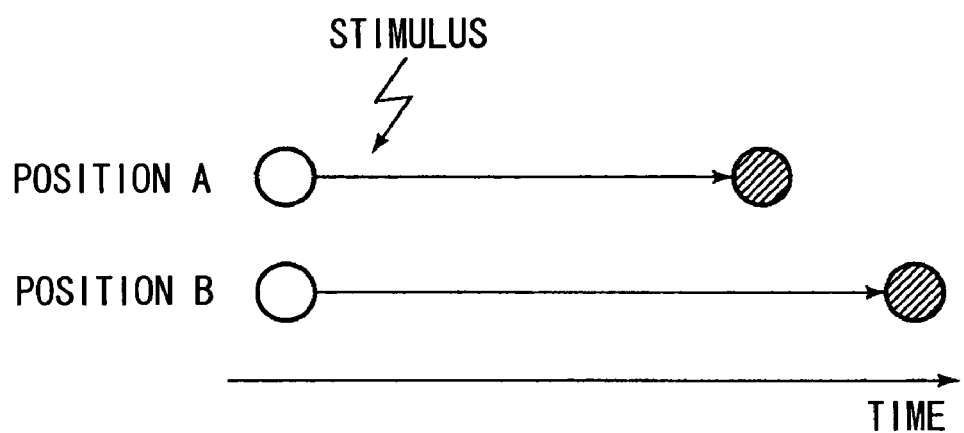
FIG. 13 shows an example of changes in response to an optical stimulus at different positions on a specimen.

Furthermore, all of the plurality of light irradiation/detection units 140 need not be used for examination; they may be used for color fading applications in which the specimen 180 is made to fade depending in the intensity of the light, or for optical stimulus applications in which a capsule inserted into a specimen to be stimulated is broken down by light and a stimulus is applied to the specimen. In this case, as exemplified in FIG. 13, an optical stimulus is applied by the light irradiation/detection unit 140 to the position A on the specimen, and the change due to the optical stimulus can be examined with a separate light irradiation/detection unit 140 disposed at another position B on the specimen. Thus, since the number of light irradiation/detection units 140 used for optical stimulation is not restricted, it is possible to conduct various types of experiment.

With the examination apparatus 100 of this embodiment, having the above-described structure, a region outside the field of view of one of the light irradiation/detection units 140 can be examined with another light irradiation/detection unit 140, which allows multiple positions on a large specimen to be examined simultaneously.

Figure 14:
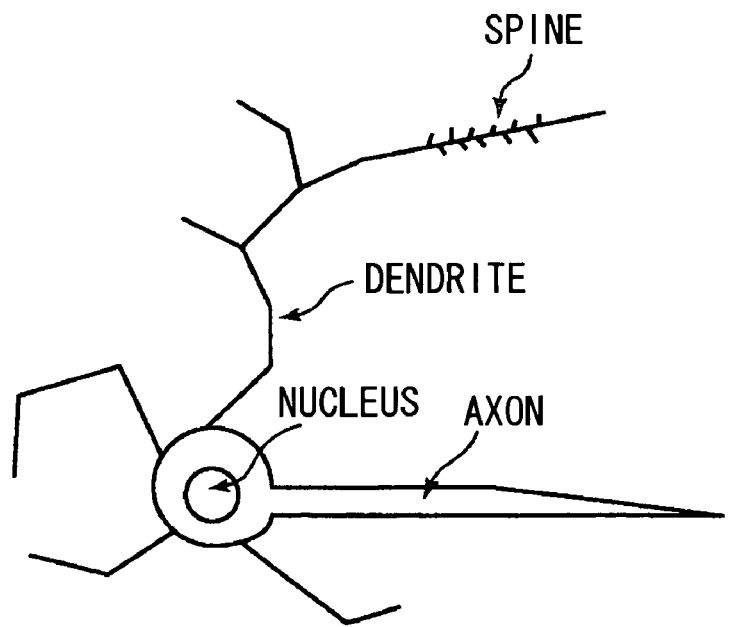
FIG. 14 shows a typical example of a nerve.

With the examination apparatus 100 of this embodiment, nerve transmission, described below, can be examined. FIG. 14 shows a typical nerve. As shown in FIG. 14, it is widely known that nerves are widely disposed throughout the bodies of animals for transmitting electrical signals. In a nerve structure, a dendrite splits off from an axon, which is the main part and includes a nucleus, and there is a part called a spine in the vicinity of the dendrite. When using the examination apparatus 100 according to this embodiment, transmission at a multiple positions of nerve cells, the relationships between soma and neurons of nerve cells, dendrites and soma, multiple dendrites at other positions, multiple spines at other positions, and so on can be examined.

Also, by using the examination apparatus 100 according to this embodiment, organs, for example, blood vessels, at different positions over a wide region of the specimen can be simultaneously examined.

Fifth Embodiment

Figure 15:
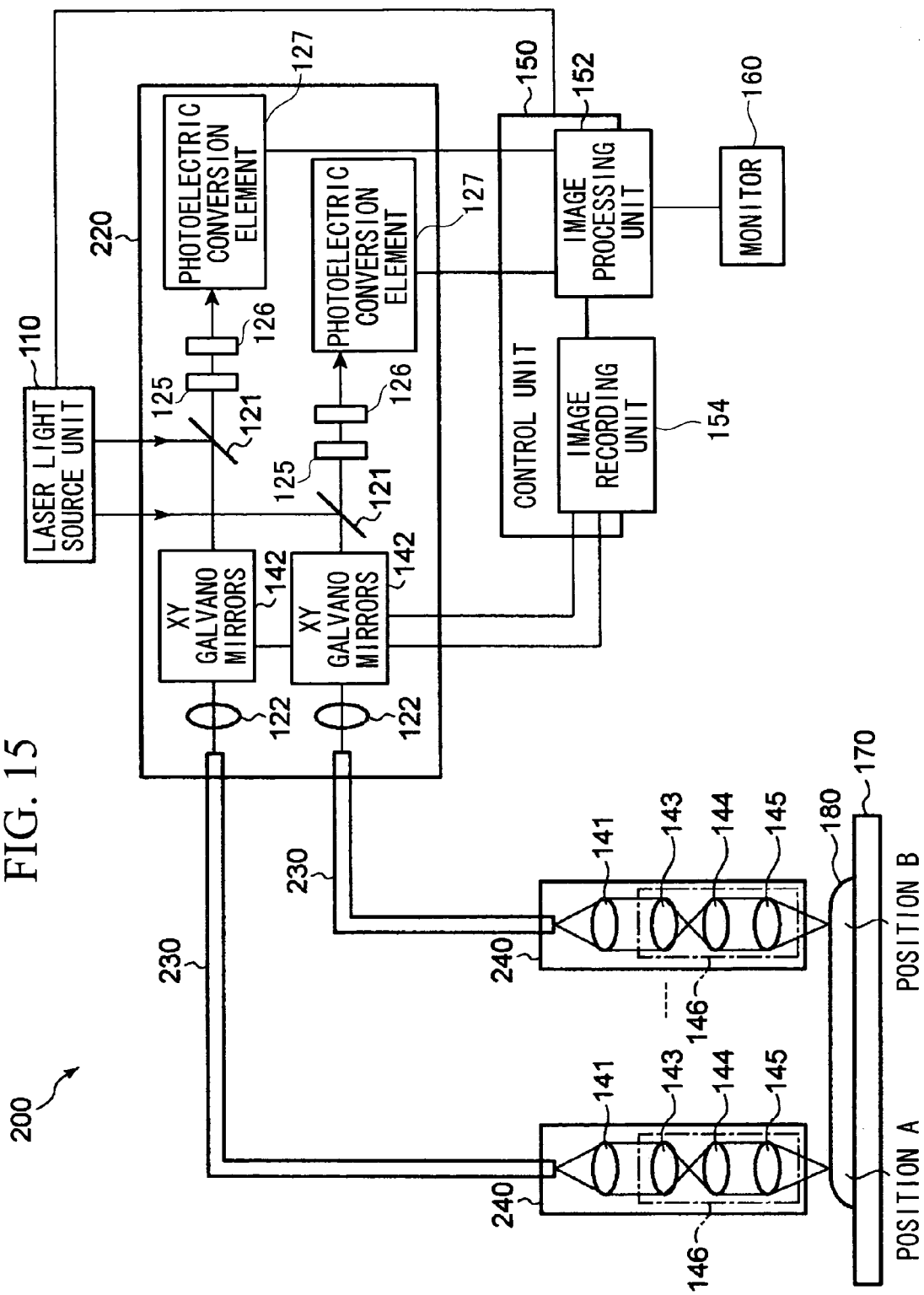
FIG. 15 schematically shows the configuration of an examination apparatus according to a fifth embodiment of the present invention.

FIG. 15 schematically shows an examination apparatus according to a fifth embodiment of the present invention. Elements in FIG. 15 having the same reference numerals as those in FIG. 12 represent the same parts, and a description thereof is omitted.

As shown in FIG. 15, an examination apparatus 200 of this embodiment includes light irradiation/detection units 240 instead of the light irradiation/detection units 140 in the fourth embodiment, an image-detecting unit 220 in place of the image-detecting unit 120 of the fourth embodiment, and optical fiber bundles 230 in place of the optical fibers 130 in the fourth embodiment.

The light irradiation/detection units 240 each include a collimator lens 141, a pupil lens 143, an imaging lens 144, and an objective lens 145. In other words, the light irradiation/detection units 240 have a configuration in which the XY galvano mirrors 142 in the light irradiation/detection units 140 of the fourth embodiment are omitted. As a result, the light irradiation/detection units 240 of this embodiment can have a more compact configuration compared to the light irradiation/detection units 140 of the fourth embodiment.

The image-detecting unit 220 includes excitation dichroic mirrors 121, collimator lenses 122, XY galvano mirrors 142, confocal pinholes 125, filters 126, and photoelectric conversion elements 127. The XY galvano mirrors 142 are positioned in the optical path between the excitation dichroic mirrors 121 and the collimator lenses 122. The XY galvano mirrors include a mirror that can oscillate about the X-axis and a mirror that can oscillate about the Y-axis, which allows the incident light beam to be scanned two-dimensionally in the X-axis and Y-axis directions. The remaining structure is the same as the image-detecting unit 120 of the fourth embodiment.

The optical fiber bundles 230 can transmit the scanned light beams. In other words, the optical fiber bundles 230 can transmit the incident light and can emit it from a position corresponding to the incident position. As a result, it is possible to two-dimensionally scan laser beam spots emitted from the light irradiation/detection units 240.

Next, an examination procedure using the examination apparatus 200 of this embodiment will be described below.

The laser light source unit 110 emits laser beams of a specified wavelength or wavelengths and with a specified intensity, according to settings from the control unit 150. The laser beams emitted from the laser light source unit 110 are introduced to the image-detecting unit 220. The laser beams introduced to the image-detecting unit 220 are reflected by the excitation dichroic mirrors 121, pass the XY galvano mirrors 142, are converged by the collimator lenses 122, are introduced to the optical fiber bundles 230, and are transmitted through the optical fiber bundles 230 to be incident on the light irradiation/detection units 240. The incident laser beams are converted to collimated beams by the collimator lenses 141, are converted to converging beams by the optical systems 146 formed of the pupil lenses 143, the imaging lenses 144, and the objective lenses 145, and are irradiated onto the specimen 180. The laser beams irradiated onto the specimen 180 form spots at the focal planes of the optical systems 146.

The laser beams converged by the collimator lenses 122 are smaller in diameter than the ends of the optical fiber bundles 230 and thus illuminate only a small region of the ends of the optical fiber bundles 230. Also, the galvano mirrors 142 scan the laser beams in the horizontal direction and the vertical direction. Accordingly, the laser beams converged by the collimator lenses 122 are scanned on the ends of the optical fiber bundles 230. The laser beams incident on the optical fiber bundles 230 are transmitted through the optical fiber bundles 230 and are emitted from positions on the ends of the optical fiber bundles 230 corresponding to the incident positions. In other words, the exit positions of the laser beams emitted into the light irradiation/detection units 240 are scanned on the ends of the optical fiber bundles 230 in response to the scanning of the laser beams by the XY galvano mirrors 142. As a result, the laser beam spots formed at the examination planes in the specimen 180 are scanned.

If the specimen 180 receiving the laser light is a fluorescent specimen, fluorescence is generated as detection light, and if the specimen 180 is a reflective specimen, reflection light is produced as the detection light. The detection light is guided to the image-detecting units 220 via the objective lenses 145, the imaging lenses 144, the pupil lenses 143, the collimator lenses 141, and the optical fiber bundles 230. The detection light beams entering the image-detecting unit 220 are converted to collimated beams by the collimator lenses 122, pass the XY galvano mirrors 142, and are incident on the excitation dichroic mirrors 121. Since the excitation dichroic mirrors 121 have characteristics whereby they transmit the wavelengths of the detection light, the detection light passes through the excitation dichroic mirrors 121. Then, in the detection light passing through the excitation dichroic mirrors 121, only the light from the vicinity of the spots on the examination planes passes through the confocal pinholes 125. Light of unwanted wavelengths is removed from the detection light passing through the confocal pinholes 125 by the filters 126, and the remaining light is incident on the photoelectric conversion elements 127. The detection light incident on the photoelectric conversion elements 127 is photoelectrically converted and output as image signals to the control unit 150.

The image processing unit 152 in the control unit 150 subjects the detection light luminance data output from the image-detecting unit 220 as image signals to analog-to-digital conversion, and arranges the luminance data based on horizontal synchronization and vertical synchronization. By outputting the arranged luminance data to the monitor 160 to display it thereon, it is possible to form images of the examination positions of the specimen 180. Also, since the control unit 150 can synchronize a plurality of signals from the photoelectric conversion elements 127 to process them, it is possible to simultaneously form images of a plurality of positions on the specimen 180 (for example, position A and position B).

Although a description has been given in the present embodiment of a technique for scanning a single spot using the XY galvano mirrors 142, in order to perform faster scanning, a plurality of spots may be scanned simultaneously. In this case, it is necessary to use an area sensor such as a CCD or PMT array having multiple photoelectric conversion parts arrayed in the form of a matrix, for example, in a photoelectric conversion device for photoelectrically converting the detection light.

With this examination apparatus 200 according to the present embodiment, similarly to the fourth embodiment, it is possible to examine a region outside the field of view of the objective lens 145 in one light irradiation/detection unit 240 with another light irradiation/detection unit 240. Therefore, it is possible to simultaneously examine a plurality of positions on a large specimen.

The main difference between this embodiment and the fourth embodiment is the position of the scanning unit. In this embodiment, since the scanning unit is provided in the image-detecting unit 220 and the number of components in the light irradiation/detection units 240 is small, it is possible to make the light irradiation/detection units 240 more compact. As a result, since the area occupied in the vicinity of the specimen is lower than in the fourth embodiment, the number of possible positions of the light irradiation/detection units 240 can be increased, which affords an advantage in that the degree of freedom in terms of position, angle, and so on can be improved.

Furthermore, when it is desired to give priority to reducing the space occupied in the vicinity of the specimen for the sake of quality, accuracy, and clarity of the specimen images, a configuration in which the light irradiation/detection units 240 are removed so that the specimen 180 can be directly examined with the optical fiber bundles 230 is possible.

Sixth Embodiment

Figure 16:
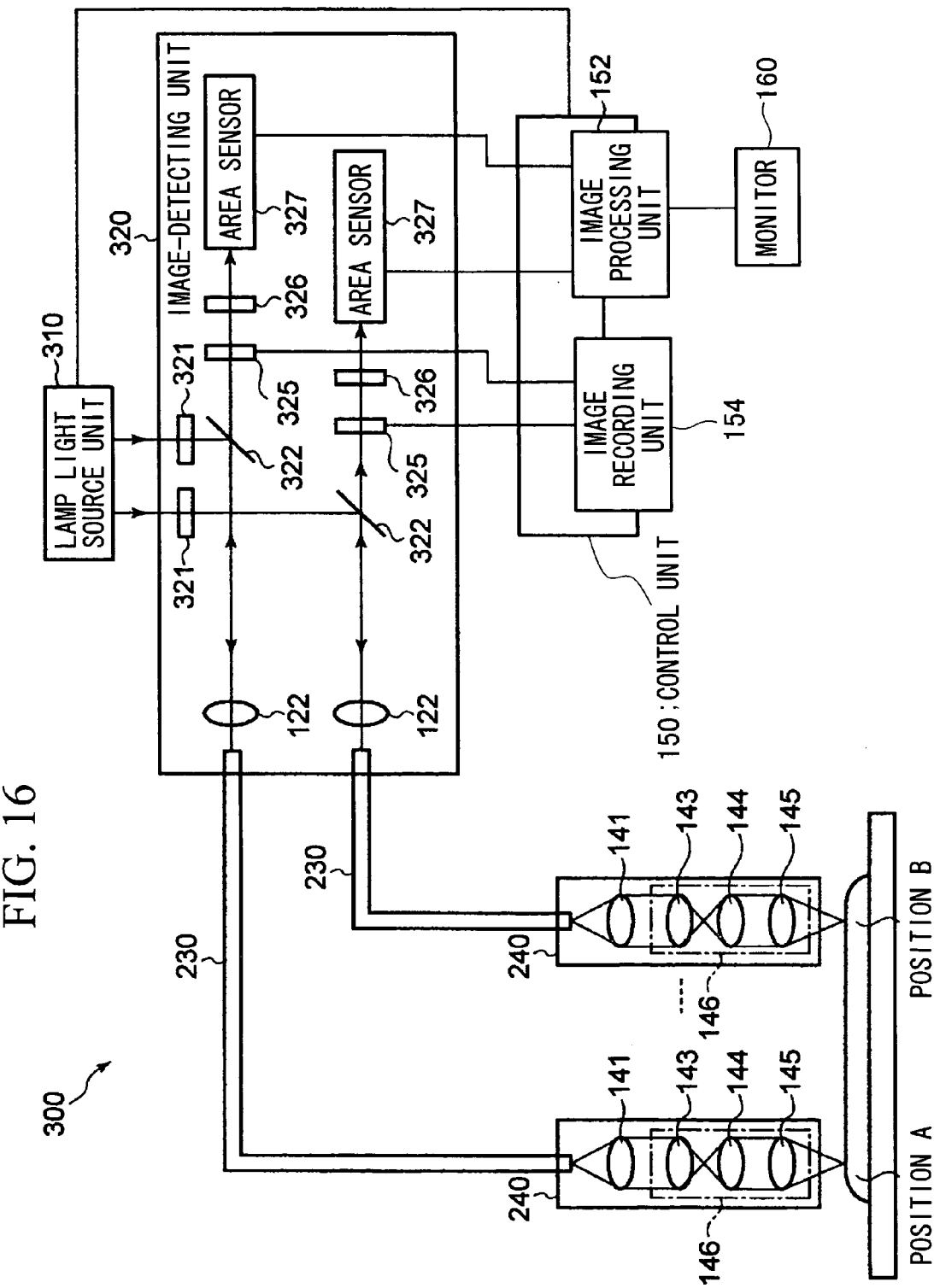
FIG. 16 schematically shows the configuration of an examination apparatus according to a sixth embodiment of the present invention.

FIG. 16 schematically shows an examination apparatus according to a sixth embodiment of the present invention. The examination apparatus of this embodiment is similar to the examination apparatus of the fifth embodiment shown in FIG. 15. In FIG. 16, the parts indicated by the same reference numerals as the parts shown in FIG. 15 represent the same parts, and a detailed description thereof is thus omitted.

As shown in FIG. 16, an examination apparatus 300 of this embodiment includes a lamp light source unit 310 instead of the laser light source unit 110 in the fifth embodiment, and an image-detecting unit 320 instead of the image-detecting unit 220 in the fifth embodiment.

The lamp light source unit 310 includes a lamp light source for illumination, for example, a mercury lamp or the like. The lamp light source unit 310 emits a plurality of illumination light beams whose diameter is large compared to that of laser beams.

The configuration of the light irradiation/detection units 240 is the same as those in the fifth embodiment.

The image-detecting unit 320 includes excitation filters 321, dichroic mirrors 332, collimator lenses 122, rotating-disk pinholes 325, filters 326, and area sensors 327. The excitation filters 321 transmit only light of specified wavelengths in the illumination light from the lamp light source unit 310. The dichroic mirrors 322 reflect only light of the excitation wavelengths and transmit light of other wavelengths. The rotating-disk pinholes 325 include a plurality of pinholes and can be rotated. The pinholes in the rotating-disk pinholes 325 selectively allow only detection light from the parts which are in confocal positional relationship therewith, in the focal plane of the optical systems 146 in the light irradiation/detection units 240, and block light coming from other parts. In other words, the rotating-disk pinholes 325 function as confocal pinholes. Also, the pinholes in the rotating-disk pinholes 325 move with the rotation of the rotating-disk pinholes 325. As a result, the regions that generate detection light, which can pass through the pinholes in the rotating-disk pinholes 325, move. Therefore, the rotating-disk pinholes 325 also effectively function as scanning units that scan the regions generating detection light. The area sensors 327 are formed, for example, of a CCD or PMT array; they function as photoelectric devices for photoelectrically converting the detection light, and include multiple photoelectric conversion parts (pixels) arrayed, for example, in a matrix. This allows information from a plurality of photoelectric conversion parts (pixels) to be acquired simultaneously.

The rotating-disk pinholes 325 are provided for acquiring confocal images; however, if it is not necessary to acquire confocal images, they may be omitted.

FIG. 16 shows an example in which two light irradiation/detection units 240 are provided; however, the examination apparatus 300 may include two or more light irradiation/detection units 240. Two optical systems (the excitation filters 321, the dichroic mirrors 322, the collimator lenses 126, the rotating-disk pinholes 325, the filters 326, and the area sensors 327) for photoelectrically converting the light detected in the light irradiation/detection units 240 are depicted in the image-detecting unit 320, corresponding to the two light irradiation/detection units 230; however, the image-detecting unit 320 may include the same number of optical systems as the light irradiation/detection units 240 or greater.

The image-detecting unit 320 in FIG. 16 has a configuration in which only light of one wavelength per illumination beam is detected; however, a configuration in which multiple wavelengths per illumination beam are detected may also be used. In this case, the image-detecting unit 320 selectively reflects light of a specified wavelength; however, a beamsplitter that transmits light of other wavelengths may be disposed in the optical path between the rotating-disk pinholes 325 and the filters 326, and another filter 326 and area filter 327 may be disposed in the optical path split off by the beamsplitter.

The control unit 150 is formed of, for example, a computer and a dedicated expansion board, and has function for controlling the rotation of the rotating-disk pinholes 325 constituting the scanning unit.

The examination procedure using the examination apparatus 300 of this embodiment will be described next.

The lamp light source unit 310 emits illumination beams according to a brightness setting from the control unit 150. The illumination beams from the lamp light source unit 310 are introduced to the image-detecting unit 320. From the illumination beams introduced to the image-detecting unit 320, only light of specific wavelengths is selectively transmitted by the excitation filters 321. The illumination beams transmitted through the excitation filters 321 are reflected by the dichroic mirrors 322 and are converged by the collimator lenses 122 to be introduced to the optical fiber bundles 230. The illumination beams converged by the collimator lenses 122 illuminate substantially the entire end faces of the optical fiber bundles 230. The illumination beams introduced into the optical fiber bundles are then transmitted through the optical fiber bundles 230 to be introduced to the light irradiation/detection units 240. The illumination beams entering the light irradiation/detection units 240 are converged by the optical systems 146 formed of the pupil lenses 143, the imaging lenses 144, and the objective lenses 145 and are irradiated onto the specimen 180. The illumination beams irradiated onto the specimen 180 illuminate a relatively wide area at the focal planes (examination planes) of the optical systems 146.

If the specimen 180 receiving the illumination light is a fluorescent specimen, fluorescence is produced as detection light, and if the specimen 180 is a reflective specimen, reflection light is produced as the detection light. The detection light is then guided to the image-detecting unit 320 via the objective lenses 145, the imaging lenses 144, the pupil lenses 143, the collimator lenses 141, and the optical fiber bundles 230. The detection beams entering the image-detecting unit 320 are converted to collimated beams by the collimator lenses 122 and are incident on the dichroic mirrors 322. Since the dichroic mirrors 322 have characteristics whereby they transmit the detection light wavelengths, the detection light is transmitted through the dichroic mirrors 322. From the detection light transmitted through the dichroic mirrors 322, only the detection light generated from the parts located in the vicinity of the examination plane and in confocal positional relation with respect to the pinholes of the rotating-disk pinholes 325 is transmitted. The rotating-disk pinholes 325 are disposed orthogonally to the optical axis and rotate. Therefore, their function is effectively the same as the regions that generate detection light being scanned over one frame of the area sensors 32. Light of unwanted wavelengths is removed from the detection light passing through the rotating-disk pinholes 325 by the filters 326, and the remaining light is incident on the area sensors 327. The detection light incident on the area sensors 327 is then photoelectrically converted and is output to the control unit 150 as an image signal of one frame. The detection light data output from the image-detecting unit 320 as image signals is sequentially output to the monitor 160 for each frame and is displayed. With the arrangement described above, it is possible to simultaneously form images of a plurality of positions (for example, position A and position B) on the specimen 180.

According to the examination apparatus 300 of this embodiment, it is possible to examine a region outside the field of view of the objective lens 145 of one light irradiation/detection unit 240 with another light irradiation/detection unit 240, which enables simultaneous examination of a plurality of positions on a large specimen.

The main difference between the present embodiment and the fifth embodiment is that an area sensor such as a CCD or PMT array is used in the photoelectric conversion device, which allows images to be acquired at high speed.

Seventh Embodiment

Figure 17:
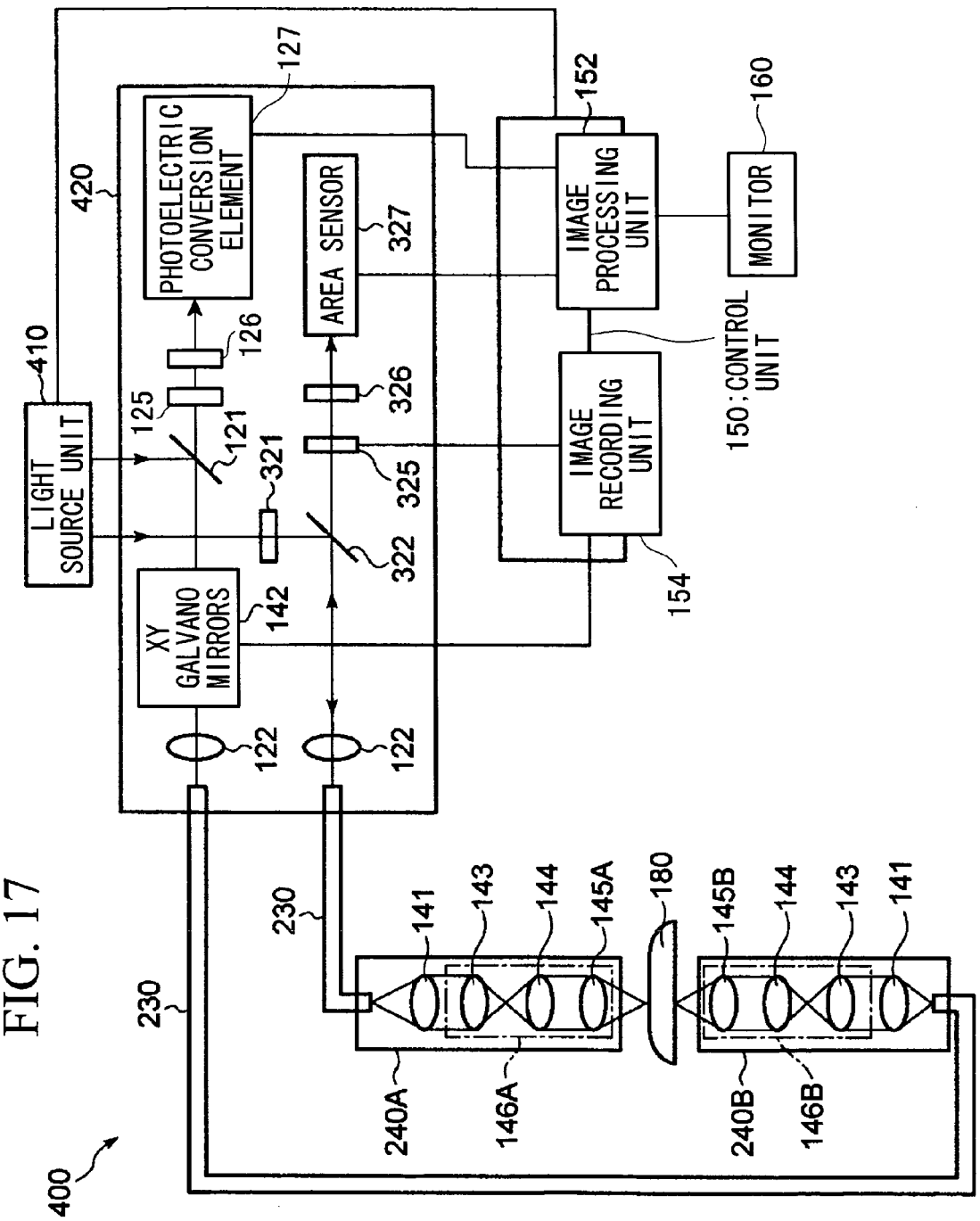
FIG. 17 schematically shows the configuration of an examination apparatus according to a seventh embodiment of the present invention.

FIG. 17 schematically shows an examination apparatus according to a seventh embodiment of the present invention. The examination apparatus of this embodiment is similar to the examination apparatus of the fifth embodiment shown in FIG. 15 and the examination apparatus of the sixth embodiment shown in FIG. 16. In FIG. 17, parts indicated with the same reference numerals as parts shown in FIG. 15 and FIG. 16 represent the same parts, and a detailed description thereof is thus omitted.

As shown in FIG. 16, an examination apparatus 400 of this embodiment includes a light source unit 410 in place of the laser light source unit 110 of the fifth embodiment and the lamp light source unit 310 of the sixth embodiment, and also includes an image-detecting unit 420 in place of the image-detecting unit 220 of the fifth embodiment and the image-detecting unit 320 of the sixth embodiment.

The examination apparatus 400 of this embodiment includes two light irradiation/detection units 240A and 240B. The examination apparatus 400 may also include other light irradiation/detection units, however. The two light irradiation/detection units 240A and 240B have a similar configuration to the light irradiation/detection units 240 of the fifth embodiment; however, the two light irradiation/detection units 240A and 240B include objective lenses 145A and 145B, respectively, having different magnifications. The two light irradiation/detection units 240A and 240B are respectively positioned above and below the specimen 180. Instead of being provided with objective lenses having different magnifications, the two light irradiation/detection units 240A and 240B may be provided with objective lenses having different fields of view.

The light source unit 410 includes a lamp light source that produces an illumination beam that is irradiated from the light irradiation/detection unit 240A and a laser that produces a laser light beam that is irradiated from the light irradiation/detection unit 240B.

The image-detecting unit 420 includes two optical systems having a function of photoelectrically converting detection light and scanning function, corresponding to the two light irradiation/detection units 240A and 240B. The optical system for the light irradiation/detection unit 240A is formed of an excitation filter 321, a dichroic mirror 322, a collimator lens 122, a rotating-disk pinhole 325, a filter 326, and an area sensor 327, similar to the sixth embodiment. The optical system for the light irradiation/detection unit 240B is formed of a dichroic mirror 121, XY galvano mirrors 142, a collimator lens 122, a confocal pinhole 125, a filter 126, and a photoelectric conversion element 127, similar to the fifth embodiment. The XY galvano mirrors 142 constitute one scanning unit, and the rotating-disk pinhole 325 constitutes another scanning unit. In other words, the two scanning units have different structures.

The control unit 150 allows both synchronized operation and independent operation of the two scanning units formed of the XY galvano mirrors 142 and the rotating-disk pinhole 325. The description "synchronized operation of the two scanning units" used here means operation wherein the two scanning units are associated in some way. For example, this includes the case where a wide region is scanned at low speed with one of the scanning units while a narrow region contained in the wide region is scanned at high speed with the other scanning unit.

Next, an examination procedure using the examination apparatus 400 of this embodiment will be described.

The light source unit 410 emits an illumination beam according to an intensity setting from the control unit 150. Also, the light source unit 410 emits laser a laser beam of a specific wavelength and a specific intensity according to settings from the control unit 150. The illumination beam entering the image-detecting unit 420 from the light source unit 410 is for the light irradiation/detection unit 240A, and the laser beam entering the image-detecting unit 420 from the light source unit 410 is for the light irradiation/detection unit 240B.

Only light of a specific wavelength in the illumination beam entering the image-detecting unit 420 is selectively transmitted by the excitation filter 321. The illumination beam transmitted through the excitation filter 321 is reflected by the dichroic mirror 322 and is converged by the collimator lens 122 to be introduced to the optical fiber bundle 230. The illumination beam converged by the collimator lens 122 illuminates substantially the entire end face of the optical fiber bundle 230. The illumination beam introduced into the optical fiber bundle 230 is transmitted through the optical fiber bundle 230 and enters the light irradiation/detection unit 240A. The illumination beam entering the light irradiation/detection unit 240A is then converged by an optical system 146A formed of the pupil lens 143, the imaging lens 144, and the objective lens 145A and is irradiated onto the specimen 180. The illumination beam irradiated onto the specimen 180 illuminates a relatively wide area in the focal plane (examination plane) of the optical system 146.

If the specimen 180 receiving the illumination light is a fluorescent specimen, fluorescence is produced as detection light, and if the specimen 180 is a reflective specimen, reflection light is produces as the detection light. The detection light is then guided to the image-detecting unit 420 via the objective lens 145A, the imaging lens 144, the pupil lens 143, the collimating lens 141, and the optical fiber bundle 230. The detection light beam entering the image-detecting unit 420 is converted to a collimated beam by the collimator lens 122 and is incident on the dichroic mirror 322. Since the dichroic mirror has a characteristic whereby it transmits the detection light wavelength, the detection light is transmitted through the dichroic mirror 322. In detection light beam transmitted through the dichroic mirror 322, only detection light produced from a part located in the vicinity of the examination plane and being in confocal positional relationship with respect to the pinhole in the rotating-disk pinhole 325 is transmitted. The rotating-disk pinhole 325 is disposed orthogonally to the optical axis and rotates. Therefore, their function is effectively the same as the parts that generate detection light being scanned over one frame of the area sensor 327. Light of unwanted wavelengths is removed from the detection light passing through the rotating-disk pinhole 325 by the filter 326, and the remaining light is incident on the area sensor 327. The detection light incident on the area sensor 327 is then photoelectrically converted and is output to the control unit 150 as an image signal of one frame.

The laser beam entering the image-detecting unit 420 is reflected by the dichroic mirror 121, passes through the XY galvano mirrors 142, is converged by the collimator lens 122 to be introduced to the optical fiber bundle 230, and is transmitted through the optical fiber bundle 230 to be introduced to the light irradiation/detection unit 240B. The laser beam entering the light irradiation/detection unit 240B is converted to a collimated beam by the collimator lens 141, is converted to a converging laser beam by the optical system 146B formed of the pupil lens 143, the imaging lens 144, and the objective lens 145B, and is irradiated onto the specimen 180. The laser beam irradiated onto the specimen 180 forms a spot at the focal plane of the optical system 146.

The XY galvano mirrors 142 scan the laser beam in the horizontal and vertical directions. Accordingly, the laser beam converged by the collimator lens 122 is scanned on the end face of the optical fiber bundle 230. The laser beam introduced to the optical fiber bundle 230 is transmitted through the optical fiber bundle 230 and is emitted from a position corresponding to the incident position on the end face of the optical fiber bundle. In other words, the exit position of the laser beam emitted from inside the light-detecting unit 240 is scanned on the end face of the optical fiber bundle 230 according to the scanning of the laser beam by the XY galvano mirrors 142. As a result, the laser beam spot formed at the examination plane of the specimen 180 is scanned.

If the specimen 180 receiving the laser beam is a fluorescent specimen, fluorescence is produced as the detection light, and if the specimen 180 is a reflective specimen, reflection light is produced as the detection light. The detection light is then guided to the image-detecting unit 420 via the objective lens 145B, the imaging lens 144, the pupil lens 143, the collimator lens 141 and the optical fiber bundle 230. The detection light beam entering the image-detection unit 420 is then converted to a collimated beam by the collimator lens 122, and is incident on the excitation dichroic mirror 121 via the XY galvano mirrors 142. Since the dichroic mirror 121 has a characteristic whereby it transmits the detection light wavelength, the detection light is transmitted through the excitation dichroic mirror 121. In the detection light transmitted through the excitation dichroic mirror 121, only light from the vicinity of the spot on the examination place passes through the confocal pinhole 125. Light of unwanted wavelengths is then removed from the detection light passing through the confocal pinhole 125 by the filter 126, and the remaining detection light is incident on the photoelectric conversion element 127. Then, the detection light incident on the photoelectric conversion element 127 is photoelectrically converted and is output as an image signal of one frame to the control unit 150.

The control unit 150 sequentially outputs the detection light data output as an image signal from the area sensor 327 in the image-detecting unit 420 to the monitor 160 for each frame to display an image. Also, the control unit 150 sequentially outputs the detection light data output as an image signal from the photoelectric conversion element 127 in the image-detecting unit 420 to the monitor 160 for each frame to display an image. With this arrangement, it is possible to simultaneously form images of the examination position on the specimen 180.

With the examination apparatus 400 of this embodiment, since the light irradiation/detection units 240A and 240B are provided with objective lenses 145A and 145B having different magnifications or different fields of view, it is possible to simultaneously carry out examination over a wide field of view and a narrow field of view of the same position on the specimen 180. For example, when carrying out examination of a heart and so on, the organ's pulse must be considered. In such applications, by carrying out micro examination (examination over a narrow field of view) of the heart tissue with a high-magnification, narrow-field light irradiation/detection unit while carrying out macro examination (examination over a wide field of view) of the entire heart with a low-magnification, wide-field light irradiation/ detection unit, it is possible to carry out examination while allowing for the organ's pulse. Also, with the low-magnification, wide-field light irradiation/detection unit, it is possible to perform positioning with respect to the specimen of the high-magnification, narrow-field light irradiation/detection unit.

By using another light irradiation/detection unit 240 (not shown in FIG. 17) in combination with the light irradiation/ detection unit 240A, it is possible to simultaneously examine another position on the specimen A.

Furthermore, since the two light irradiation/detection units 240A and 240B are placed above and below the specimen 180 so as to sandwich it therebetween, for example, at the same time as carrying out reflection examination or fluorescence examination with one of these units, namely, the light irradiation/detection unit 240A, it is also possible to carry out transmission examination using the other unit, namely, the light irradiation/detection unit 240B, using the light emitted from the light irradiation/detection unit 240A as illumination light. In this case, a plurality of light irradiation/detection units include the light irradiation/ detection unit 240A for reflection examination or fluorescence examination and the light irradiation/detection unit 240B for transmission examination.

As exemplified by the galvano mirrors 142 and the rotating-disk pinhole 325, serving as the scanning units, the plurality of scanning units need not be of the same type. Therefore, a combination of scanning units such as a galvanometer mirror, a DMD (digital micromirror device), a vibrating galvano mirror, or a polygon mirror may be used. With this configuration, the scanning units can be selected as desired to match the accuracy and moving speed of the specimen.

Furthermore, by synchronously driving the plurality of scanning units, it is possible to carry out synchronous image examination of various examination positions on the specimen. For example, when one of the scanning units is scanned at a certain speed, by scanning the other scanning unit at a speed several times higher, it is possible to simultaneously carry out static examination and dynamic examination of the specimen.

Although the fourth to seventh embodiments have been discussed so far with reference to the drawings, the present invention is not limited to these embodiments. Various modifications and changes may be made without departing from the scope of the present invention.

For example, instead of the pinhole disk in the embodiments described above, a slit disk in which multiple slits having the same width as the pinholes are formed may be used.

Additional Items

The following configurations are derived from the fourth to seventh embodiments described above.

Additional Item 4

The present invention also provides an examination apparatus including a light source unit for generating a plurality of light beams; a plurality of light irradiation/detection units for irradiating the plurality of light beams onto a specimen and for detecting detection light generated from the specimen due to the irradiation with the light beams; an image-detecting unit for photoelectrically converting the detection light detected in the plurality of light irradiation/detection units to generate image signals; a plurality of scanning units for scanning the parts that generate the detection light photoelectrically converted in the image-detecting unit; and a plurality of optical fiber units for optically connecting the image-detecting unit and the plurality of light irradiation/detection units.

Additional Item 5

The examination apparatus in Additional Item 4 may also include an image processing unit for processing the image signals produced in the image-detecting unit to form an image, and an image display unit for displaying the image formed in the image-processing unit.

Additional Item 6

The examination apparatus in Additional Item 4 may also include an image processing unit for processing the image signals produced in the image-detecting unit to form an image, and an image recording unit for recording the image formed in the image-processing unit.

Additional Item 7

In the examination apparatus in Additional Item 4, the image-detecting unit may include at least one confocal pinhole that is in confocal relation with at least one region generating the detection light.

Additional Item 8

In the examination apparatus in Additional Item 4, the optical fiber units are formed of optical fiber bundles, the image-detecting unit includes a plurality of photoelectric conversion devices for photoelectrically converting the detection light detected in the plurality of light irradiation/detection units, and the photoelectric conversion devices are formed of area sensors having multiple photoelectric conversion parts formed in an array.

Additional Item 9

In the examination apparatus in Additional Item 4, the light irradiation/detection units may include the scanning units.

Additional Item 10

In the examination apparatus in Additional Item 4, the image-detecting unit may include the scanning units, and the optical fiber units may be formed of optical fiber bundles.

Additional Item 11

In the examination apparatus in Additional Item 4, at least two of the plurality of scanning units may have different configurations.

Additional Item 12

In the examination apparatus in Additional Item 4, a control unit for controlling the plurality of scanning units may be provided, and the control unit may synchronously drive at least two of the scanning units.

Additional Item 13

In the examination apparatus in Additional Item 4, at least one of the plurality of light irradiation/detection units is provided with a function for applying a stimulus with light.

Additional Item 14

In the examination apparatus in Additional Item 4, at least two of the plurality of light irradiation/detection units may be provided with objective lenses having different magnifications from each other.

Additional Item 15

In the examination apparatus in Additional Item 4, at least two of the plurality of light irradiation/detection units may be provided with objective lenses having different fields of view from each other.

Additional Item 16

In the examination apparatus in Additional Item 4, the plurality of light irradiation/detection units may include at least two of a light irradiation/detection unit for reflection examination, a light irradiation/detection unit for fluorescence examination, and a light irradiation/detection unit for transmission examination Additional Item 17

In the examination apparatus in Additional Item 4, the image-detecting unit can be connected to the plurality of light irradiation/detection units.

Additional Item 18

The present invention also provides an examination method in which the same position on a specimen is simultaneously examined using the examination apparatus described in Additional Item 4.

Additional Item 19

The present invention also provides an examination method in which separate positions on a specimen are simultaneously examined using the examination apparatus in Additional Item 4.

Additional Item 20

The invention also provides an examination method in which dynamic examination and static examination can be carried out using the examination apparatus described in Additional Item 12.

Additional Item 21

The invention also provides an examination method in which an optical stimulus is applied using the examination apparatus described in Additional Item 13.

Additional Item 22

The invention also provides an examination method in which wide-field examination and narrow-field examination can be simultaneously performed using the examination apparatus described in Additional Item 14 or the examination apparatus described in Additional Item 15.

Additional Item 23

The invention also provides an examination method in which a specimen of a narrow-field light irradiation/detection unit (a light irradiation/detection unit including a low-magnification objective lens or a light irradiation/detection unit including an objective lens with a wide field of view) can be positioned with respect to a wide-field light irradiation/detection unit (a light irradiation/detection unit including a high-magnification objective lens or a light irradiation/detection unit including an objective lens with a narrow field of view) using the examination apparatus described in Additional Item 14 or the examination apparatus described in Additional Item 15.

Additional Item 24

The invention also provides an examination method in which at least two types of examination from reflection examination, fluorescence examination, and transmission examination are simultaneously carried out.

The present invention provides an examination apparatus that can perform simultaneous examination of a plurality of positions on a specimen.

What is claimed is:

1. An optical-scanning examination apparatus comprising:
    a light source unit;
    a focusing lens for forming a first intermediate image of excitation light emitted from the light source unit;
    an imaging lens for focusing the first intermediate image;
    a first objective lens for forming a second intermediate image of the excitation light focused by the imaging lens;
    an optical fiber bundle one end face of which is disposed near the second intermediate image position;
    a second objective lens, disposed at the other end face of the optical fiber bundle, for imaging light emitted from the other end face of the optical fiber bundle onto a specimen;
    an imaging unit for imaging return light that returns via the second objective lens, the optical fiber bundle, the first objective lens, and the imaging lens; and
    a scanning mirror device, disposed at the first intermediate image position, the scanning mirror device being formed of a plurality of mirrors that simultaneously receive the first intermediate image and that is selectively turned on and off.

2. An optical-scanning examination apparatus according to claim 1, further comprising:
    a control apparatus for controlling the driving pattern of each mirror constituting the scanning mirror device.

3. An optical-scanning examination apparatus according to claim 1, wherein the optical fiber bundle includes a plurality of fiber cores, and each mirror constituting the scanning mirror device and each fiber core constituting the optical fiber bundle are disposed in one-to-one correspondence.

4. An optical-scanning examination apparatus according to claim 1, wherein the optical fiber bundle includes a plurality of fiber cores, and each mirror constituting the scanning mirror device and each fiber core constituting the optical fiber bundle are disposed in one-to-many or many-to-one correspondence.

5. An optical-scanning examination apparatus according to claim 1, further comprising:
    a galvano mirror,
    wherein the first image is formed in the shape of a line;
    the plurality of mirrors, which is selectively turned on and off, in the scanning mirror device are arrayed in at least one row; and
    the galvano mirror scans the light reflected at the mirrors constituting the scanning mirror device in a direction orthogonal to the arrayed direction of the mirrors.

* * * * *